United States Patent
Han et al.

(10) Patent No.: US 12,509,486 B2
(45) Date of Patent: *Dec. 30, 2025

(54) DNA GRIDIRON COMPOSITIONS AND METHODS

(71) Applicant: ARIZONA BOARD OF REGENTS ON BEHALF OF ARIZONA STATE UNIVERSITY, Scottsdale, AZ (US)

(72) Inventors: Dongran Han, Cambridge, MA (US); Hao Yan, Chandler, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 253 days.

This patent is subject to a terminal disclaimer.

(21) Appl. No.: 18/228,604

(22) Filed: Jul. 31, 2023

(65) Prior Publication Data

US 2024/0150392 A1   May 9, 2024

Related U.S. Application Data

(63) Continuation of application No. 16/938,474, filed on Jul. 24, 2020, now Pat. No. 11,760,774, which is a continuation of application No. 16/202,841, filed on Nov. 28, 2018, now Pat. No. 10,774,107, which is a continuation of application No. 15/121,007, filed as application No. PCT/US2015/017553 on Feb. 25, 2015, now Pat. No. 10,189,874.

(60) Provisional application No. 61/944,677, filed on Feb. 26, 2014.

(51) Int. Cl.
C07H 21/04     (2006.01)
C07H 1/00      (2006.01)

(52) U.S. Cl.
CPC .............. *C07H 21/04* (2013.01); *C07H 1/00* (2013.01)

(58) Field of Classification Search
CPC ............ C07H 1/00; C12Q 19/34; C12Q 1/68
USPC ............ 435/6.1, 91.1, 91.31, 455; 514/44 A, 514/44 R; 536/23.1, 24.5
See application file for complete search history.

(56) References Cited

U.S. PATENT DOCUMENTS

| | | | |
|---|---|---|---|
| 4,469,863 A | 9/1984 | Ts'o et al. | |
| 4,559,157 A | 12/1985 | Smith et al. | |
| 4,608,392 A | 8/1986 | Jacquet et al. | |
| 4,612,302 A | 9/1986 | Szabo et al. | |
| 4,684,620 A | 8/1987 | Hruby et al. | |
| 4,816,567 A | 3/1989 | Cabilly et al. | |
| 4,820,508 A | 4/1989 | Wortzman | |
| 4,853,371 A | 8/1989 | Coy et al. | |
| 4,873,192 A | 10/1989 | Kunkel | |
| 4,938,949 A | 7/1990 | Borch et al. | |
| 4,992,478 A | 2/1991 | Geria | |
| 5,023,243 A | 6/1991 | Tullis | |
| 6,239,116 B1 | 5/2001 | Krieg et al. | |
| 10,189,874 B2 * | 1/2019 | Han | C07H 1/00 |
| 10,774,107 B2 * | 9/2020 | Han | C07H 21/04 |
| 11,760,774 B2 * | 9/2023 | Han | C07H 1/00 536/23.1 |
| 2007/0082352 A1 | 4/2007 | Cumpson | |
| 2008/0124366 A1 | 5/2008 | Ohlfest et al. | |
| 2011/0275702 A1 | 11/2011 | Chang et al. | |
| 2012/0190732 A1 | 7/2012 | Chang et al. | |
| 2015/0004193 A1 | 1/2015 | Chang et al. | |

FOREIGN PATENT DOCUMENTS

WO   WO2010060030 A1   5/2010
WO   WO2013119676 A1   8/2013

OTHER PUBLICATIONS

Agrawal et al., (1988). "Oligodeoxynucleoside phophoramidates and phosphorrothioates as inhibitors of human immunodeficiency virus." Proc. Natl. Acad. Sci. 85: 7079-7083.

Agrawal et al., (1992). "Antisense oligonucleotides as antiviral agents." Trends in Biotechnology 10: 152-158.

Bachmann et al., (2010). "Vaccine delivery: a matter of size, geometry, kinetics and molecular patterns." Natural Reviews Immunology 10:787-796.

Ballas et al., (1996). "Induction of NK Activity in Murine and Human Cells by CpG Motifs in Oligodeoxynucleotides and Bacterial DNA." J. Immunol. 157(5): 1840-1845.

Beaucage et al., (1981). "Deoxynucleoside Phosphoramidites—A New Class of Key Intermediates for Deoxypolynucleotide Synthesis." Tetrahedron Letters 22(20): 1859-1862.

Bode et al., (2011). "CpG DNA as a vaccine adjuvant." Expert Rev. Vaccines 10(4): 499-511.

Burton, (2010). "Scaffolding to build a rational vaccine design strategy." PNAS 107(42): 17859-17860.

(Continued)

*Primary Examiner* — Jane J Zara
(74) *Attorney, Agent, or Firm* — Michael Best & Friedrich LLP

(57) ABSTRACT

Novel compositions and methods for engineering wireframe architectures and scaffolds of increasing complexity by creating gridiron-like DNA structures (FIG. 1). A series of four-arm junctions are used as vertices within a network of double-helical DNA fragments. Deliberate distortion of the junctions from their most relaxed conformations ensures that a scaffold strand can traverse through individual vertices in multiple directions. DNA gridirons, ranging from two-dimensional arrays with reconfigurability to multilayer and three-dimensional structures and curved objects, can be assembled according the methods presented herein.

15 Claims, 5 Drawing Sheets

(5 of 5 Drawing Sheet(s) Filed in Color)

Specification includes a Sequence Listing.

(56) References Cited

OTHER PUBLICATIONS

Cao and Chen, "Characterization of Antibody Responses Against the 2F5 Epitope ELDKWA Using HIV-1 Env-Mediated Membrane Fusion and Neutralization Assays." Tsinghua Science and Technology, 2010; 15(4): 447-451.
Clackson et al., (1991). "Making antibody fragments using phage display libraries." Nature 352: 624-628.
Cowdrey et al., (1996). "Bacterial DNA Induces NK Cells to Produce IFN-gamma In Vivo and Increases the Toxicity of Lipopolysaccharides." The Journal of Immunology 156(12): 4570-4575.
Dayhoff et al., (1978). "A Model of Evolutionary Change in Proteins." Atlas of Protein Sequence and Structure 345-352.
Dietz H. et al., "Folding DNA into Twisted and Curved Nanoscale Shapes", Science 325(5941), 725-730 (2009).
Douglas S. et al., "Self-assembly of DNA into nanoscale three-dimensional shapes", Nature 459, 414-418 (2009).
Elgueta et al., (2010). The immortality of humeral immunity. Immunological Reviews 236: 139-150.
Froehler et al., (1986). "Deoxyncleoside H-Phosphonate diester intermediates in the synthesis of internucleotide phosphate analogues." Tetrahedron Letters 27(46): 5575-5578.
Froehler et al., (1986). "Synthesis of DNA via deoxynucleoside H-phosphonate intermediates." Nucleic Acids Research 14( 13 ): 5399-5407.
Fu T. et al., "DNA Double-Crossover Molecules", Biochemistry 32(13), 3211-3220 (1993).
Gaffney et al., (1988). "Large-scale oligonucleotide synthesis by the H-phosphonate method." Tetrahedron Letters 29(22): 2619-2622.
Garegg et al., (1986). "Nucleoside H-Phosphonates. Ill. Chemical synthesis of oligodeoxyribonucleotides by the hydrogenphophonate approach." Tetrahedron Letters 27(34): 4051-4054.
Garegg et al., (1986). "Nucleoside H-phosphonates. IV. Automated solid phase synthesis of oligoribonucleotides by the hydrogenphosphonate approach." Tetrahedron Letters 27(34): 4055-4058.
Gietl A. et al., "DNA origami as biocompatible surface to match single-molecule and ensemble experiments", Nucleic Acids Res 40(14), e110 (2012), 10 pages.
Goodchild (1990). "Conjugates of oligonucleotides and modified oligonucleotides: a review of their synthesis and properties." Bioconjugate Chemistry 1 (3): 165-187.
Han D. et al., "DNA gridiron nanostructures based on four-arm junctions", Science 339(6126), 1412-1415 (2013).
Han et al., (2011). "DNA Origami with Complex Curvatures in Three-Dimensional Space." Science 332(6027): 342-346.
He et al., (2008). "Hierarchical self-assembly of DNA into symmetric supramolecular polyhedral." Nature 452: 198-202.
Hosmalin et al. Priming With T Helper Cell Epitope Peptides Enhances the Antibody Response to the Envelope Glycoprotein of HIV-1 In Primates. J. Immunol. 1991; 146(5): 1667-1673.
Jerala M. et al., "A DNA Origami of Slovenia in Nano Dimensions", Acta Chim Slav 58(1), 181-184 (2011).
Ke et al., (2008). "Self-Assembled Water-Soluble Nucleic Acid Probe Tiles for Label-Free RNA Hybridization Assays." Science 319: 180-183.
Kohler et al., (1975). "Continuous cultures of fused cells secreting antibody of predefined specificity." Nature 256:495-497.
Krieg et al., (1995). "CpG motifs in bacterial DNA trigger direct B-cell activation." Nature 374(6522): 546-549.
Kunkel et al., (1987). "Rapid and efficient site-specific mutagenesis without phenotypic selection." Methods in Enzymology 154: 367-382.
Kunkel, (1985). "Rapid and efficient site-specific mutagenesis without phenotypic selection." Proc. Natl. Acad. Sci. 82: 488-492.
Kutsch et al., (2002). "Direct and Quantitative Single-Cell Analysis of Human Immunodeficiency Virus Type 1 Reactivation from Latency." J Viral. 76(17): 8776-8786.

Li et al., (2011). "Self-Assembled Multivalent DNA Nanostructures for Noninvasive Intracellular Delivery of Immunostimulator CpG Oligonucleotides." ACS Nano 5(11 ): 8783-8789.
Liu et al., (2011). "Targeted Cell-Cell Interactions by DNA Nanoscaffold-Templated Multivalent Bispecific Aptamers." Small 7(12): 1673-1682.
Liu et al., (2012). "A DNA Nanostructure Platform for Directed Assembly of Synthetic Vaccines." Nano Letters 12: 4254-4259.
Lu et al., (2010). "Polyvalent AIDS Vaccines." Current HIV Research 8(8): 622-629.
Mao C. et al., "Designed Two-Dimensional DNA Holliday Junction Arrays Visualized by Atomic Force Microscopy", J I\m Chem Soc 121(23), 5437-5443 (1999).
Marini M. et al., "A Revertible, Autonomous, Self-Assembled DNA-Origami Nanoactuator", Nano Lett 11(12), 5449-5454 (2011).
Marks et al., (1991). "By-passing immunization: Human antibodies from V-gene libraries displayed on phage." Journal of Molecular Biology 222(3): 581-597.
Marks et al., (1992). "By-Passing Immunization: Building High Affinity Human Antibodies by Chain Shuffling." Bio/ Technology 10: 779-783.
Mccafferty et al., (1990). "Phage antibodies: filamentous phage displaying antibody variable domains." Nature 348: 552-554.
Mcelrath et al., (2010) "Induction of Immunity to Human Immunodeficiency Virus Type-1 by Vaccination." Immunity 33(4): 542-554.
Mcghee et al., (1993). "New Perspectives in Mucosal Immunity With Emphasis On Vaccine Development," Sem. Hematol., 30(4): 3-15.
Mckinney S. et al., "Structural dynamics of individual Holliday junctions", Nature Struct Biol 10(2), 93-97 (2002).
Miick S. et al., "Crossover isomer bias is the primary sequence-dependent property of immobilized Holliday junctions" Proc Nall Acad Sci USA 94(17), 9080-9084 (1997).
Morrison et al., (1984). "Chimeric human antibody molecules: Mouse antigen-binding domains with human constant region domains." Proc. Natl. Acad. Sci. 81: 6851-6855.
Moses et al., (2007). "The growing applications of click chemistry." Chem. Soc. Rev. 2007 36(8): 1249-62.
Mouquet et al., (2010). "Polyreactivity increases the apparent affinity of anti-HIV antibodies by heteroligation." Nature 467: 591-596.
Ofek et al., (2010). "Elicitation of Structure-Specific Antibodies by Epitope Scaffolds." PNAS 107(42): 17880-17887.
Patent Cooperation Treaty, International Search Authority, Search Report and Written Opinion for PCT/US15/17553, 16 pages, Jun. 17, 2015.
Patent Cooperation Treaty, International Searching Authority, Search Report and Written Opinion for PCT/ US2013/24945, 9 pages, May 20, 2013.
Roberts et al., (2011). "B cells do not take up bacterial DNA: an essential role for antigen in exposure of DNA to toll-like receptor-9." Immunology & Cell Biology 89(4): 517-525.
Rostovtsev et al., (2002). "A Stepwise Huisgen Cycloaddition Process: Copper (1)-Catalyzed Regioselective 'Ligation' of Azides and Terminal Alkynes." Angew. Chem. Int. Ed. 41(14): 2596-2599.
Rothemund W., "Folding DNA to create nanoscale shapes and patterns", Nature 440, 297-302 (2006).
Seeman N., "Nanomaterials Based on DNA", Annu Rev Biochem 79, 65-87 (2010).
Seeman, (2003). "At the Crossroads of Chemistry, Biology, and Materials: Structural DNA Nanotechnology." Chemistry & Biology 10: 1151-1159.
Uhlmann et al., (1990). "Antisense Oligonucleotides: A New Therapeutic Principle." Chemical Reviews 90(4).
Van Duyne et al., (2009). "The utilization of humanized mouse models for the study of human retroviral infections." Retrovirology 6: 76.
Waterhouse et al., (1993). "Combinatorial infection and in vivo recombination: a strategy for making large phage antibody repertoires." Nucleic Acids Research 21 (9): 2265-2266.
Zhang et al., (2010). "Exterior Modification of a DNA Tetrahedron." Chem Commun. 46: 6792-6794.

(56) References Cited

OTHER PUBLICATIONS

Zhao et al., (2010). "A Route to Scale up DNA Origami using DNA Tiles as Folding Staples." Angew. Chem. Int. Ed. 49: 1414-1417.
Zhao Z et al., "Organizing DNA Origami Tiles Into Larger Structures Using Preformed Scaffold Frames", Nano Lett 11 (7), 2997-3002 (2011).
Zolla-Pazner "Identifying Epitopes of HIV-1 That Induce Protective Antibodies". Nat. Rev. Immunol. 2004; 4:199-210.
Zolnik et al. "Minireview: Nanoparticles and the Immune System." Endocrinol. 2010; 151 (2): 458-465.

\* cited by examiner

SEQUENCE LISTING

```
Sequence total quantity: 282
SEQ ID NO: 1            moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 1
gaaaattcat aagtaagcgt catacatggc ttagacggga ga                             42

SEQ ID NO: 2            moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 2
atattcacaa aataaaaaca gggaagcgca ttttgatgat ac                             42

SEQ ID NO: 3            moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 3
aggagtgtac taataaacag ccatattatt taattggcct tg                             42

SEQ ID NO: 4            moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 4
gccagttaca aggtaataag ttttaacggg gtgtcctgaa ca                             42

SEQ ID NO: 5            moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 5
gcagaacgcg cgaggttgag gcaggtcaga cgtcccaatc ca                             42

SEQ ID NO: 6            moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 6
aataagaaac ggacttgagc catttgggaa ttttcagcta at                             42

SEQ ID NO: 7            moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 7
gagagaataa ccaaataaat cctcattaaa gcaaaagggc ga                             42

SEQ ID NO: 8            moltype = DNA   length = 42
FEATURE                 Location/Qualifiers
misc_feature            1..42
                        note = Staple Strand
```

```
source                    1..42
                          mol_type = other DNA
                          organism = synthetic construct
SEQUENCE: 8
agcattgaca gctgtttatc aacaatagat aacagtgcct tg                             42

SEQ ID NO: 9              moltype = DNA   length = 42
FEATURE                   Location/Qualifiers
misc_feature              1..42
                          note = Staple Strand
source                    1..42
                          mol_type = other DNA
                          organism = synthetic construct
SEQUENCE: 9
agtaacagtg cccagtaata agagaatata aaagccgccg cc                             42

SEQ ID NO: 10             moltype = DNA   length = 42
FEATURE                   Location/Qualifiers
misc_feature              1..42
                          note = Staple Strand
source                    1..42
                          mol_type = other DNA
                          organism = synthetic construct
SEQUENCE: 10
gcatttcga gccgtataaa cagttaatgc cctatcaaaa tc                              42

SEQ ID NO: 11             moltype = DNA   length = 42
FEATURE                   Location/Qualifiers
misc_feature              1..42
                          note = Staple Strand
source                    1..42
                          mol_type = other DNA
                          organism = synthetic construct
SEQUENCE: 11
attaagacgc tcgccaccag aaccaccacc aggtaccgac aa                             42

SEQ ID NO: 12             moltype = DNA   length = 42
FEATURE                   Location/Qualifiers
misc_feature              1..42
                          note = Staple Strand
source                    1..42
                          mol_type = other DNA
                          organism = synthetic construct
SEQUENCE: 12
aaggtaaagt aagcaccatt accattagca aggatagctt ag                             42

SEQ ID NO: 13             moltype = DNA   length = 44
FEATURE                   Location/Qualifiers
misc_feature              1..44
                          note = Staple Strand
source                    1..44
                          mol_type = other DNA
                          organism = synthetic construct
SEQUENCE: 13
tttaccgttc ctggtttacc agcgccaaag accagaatgg aaag                           44

SEQ ID NO: 14             moltype = DNA   length = 42
FEATURE                   Location/Qualifiers
misc_feature              1..42
                          note = Staple Strand
source                    1..42
                          mol_type = other DNA
                          organism = synthetic construct
SEQUENCE: 14
cattcaaccg attgacggaa attattcatt aaagccttta ca                             42

SEQ ID NO: 15             moltype = DNA   length = 40
FEATURE                   Location/Qualifiers
misc_feature              1..40
                          note = Staple Strand
source                    1..40
                          mol_type = other DNA
                          organism = synthetic construct
SEQUENCE: 15
gaaaatagca ggtgaattat caccgtcacc attttttgtt                                40

SEQ ID NO: 16             moltype = DNA   length = 42
FEATURE                   Location/Qualifiers
misc_feature              1..42
```

```
                        note       = Staple Strand
source                  1..42
                        mol_type   = other DNA
                        organism   = synthetic construct
SEQUENCE: 16
gcaaagacac cgtaaatgaa ttttctgtat ggtaattgag cg                           42

SEQ ID NO: 17           moltype = DNA  length = 42
FEATURE                 Location/Qualifiers
misc_feature            1..42
                        note       = Staple Strand
source                  1..42
                        mol_type   = other DNA
                        organism   = synthetic construct
SEQUENCE: 17
tagcattcca caccctgaac aaagtcagag gggattttgc ta                           42

SEQ ID NO: 18           moltype = DNA  length = 42
FEATURE                 Location/Qualifiers
misc_feature            1..42
                        note       = Staple Strand
source                  1..42
                        mol_type   = other DNA
                        organism   = synthetic construct
SEQUENCE: 18
aacaactttc acgctaacga gcgtctttcc agacaacgcc tg                           42

SEQ ID NO: 19           moltype = DNA  length = 42
FEATURE                 Location/Qualifiers
misc_feature            1..42
                        note       = Staple Strand
source                  1..42
                        mol_type   = other DNA
                        organism   = synthetic construct
SEQUENCE: 19
aatcttacca aacagtttca gcggagtgag aaatgtagaa ac                           42

SEQ ID NO: 20           moltype = DNA  length = 42
FEATURE                 Location/Qualifiers
misc_feature            1..42
                        note       = Staple Strand
source                  1..42
                        mol_type   = other DNA
                        organism   = synthetic construct
SEQUENCE: 20
agaaaataa tgtttcgtca ccagtacaaa ctagcctaat tt                            42

SEQ ID NO: 21           moltype = DNA  length = 42
FEATURE                 Location/Qualifiers
misc_feature            1..42
                        note       = Staple Strand
source                  1..42
                        mol_type   = other DNA
                        organism   = synthetic construct
SEQUENCE: 21
attaactgaa cagacagccc tcatagttag cgacaatcaa ta                           42

SEQ ID NO: 22           moltype = DNA  length = 40
FEATURE                 Location/Qualifiers
misc_feature            1..40
                        note       = Staple Strand
source                  1..40
                        mol_type   = other DNA
                        organism   = synthetic construct
SEQUENCE: 22
aacaacatga gagccagcaa aatcaccagt attctgtcca                              40

SEQ ID NO: 23           moltype = DNA  length = 42
FEATURE                 Location/Qualifiers
misc_feature            1..42
                        note       = Staple Strand
source                  1..42
                        mol_type   = other DNA
                        organism   = synthetic construct
SEQUENCE: 23
cgtaacactg aatcccatcc taatttacga gctagaaagg aa                           42

SEQ ID NO: 24           moltype = DNA  length = 42
FEATURE                 Location/Qualifiers
```

```
misc_feature            1..42
                        note = Staple Strand
source                  1..42
                        mol_type = other DNA
                        organism = synthetic construct
SEQUENCE: 24
caactaaagg attaacaacg ccaacatgta atacccatgt ac                          42

SEQ ID NO: 25           moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 25
aatcgccata tattgcgaat aataattttt tcgcttaggt tg                          42

SEQ ID NO: 26           moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 26
ataggtctga ggggatagca agcccaatag gattaggcag ag                          42

SEQ ID NO: 27           moltype = DNA  length = 44
FEATURE                 Location/Qualifiers
misc_feature            1..44
                        note = Staple Strand
source                  1..44
                        mol_type = other DNA
                        organism = synthetic construct
SEQUENCE: 27
tccagacgtt aacggaataa gtttattttg tctaacgatc taaa                        44

SEQ ID NO: 28           moltype = DNA  length = 40
FEATURE                 Location/Qualifiers
misc_feature            1..40
                        note = Staple Strand
source                  1..40
                        mol_type = other DNA
                        organism = synthetic construct
SEQUENCE: 28
tcgcccacgc agccattgca acaggaaaaa tgcgccgaca                             40

SEQ ID NO: 29           moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 29
cctcattttc aagactacct ttttaacctc cgacgttgaa aa                          42

SEQ ID NO: 30           moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 30
tctccaaaaa atgaattacc ttttttaatg gagagccacc ac                          42

SEQ ID NO: 31           moltype = DNA  length = 40
FEATURE                 Location/Qualifiers
misc_feature            1..40
                        note = Staple Strand
source                  1..40
                        mol_type = other DNA
                        organism = synthetic construct
SEQUENCE: 31
atataagtat ttgacgctca atcgtctgaa gataagtgcc                             40

SEQ ID NO: 32           moltype = DNA  length = 42
```

```
FEATURE                 Location/Qualifiers
misc_feature            1..42
                        note = Staple Strand
source                  1..42
                        mol_type = other DNA
                        organism = synthetic construct
SEQUENCE: 32
accctcagag cgagaagagt caatagtgaa ttcctgccta tt                        42

SEQ ID NO: 33           moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 33
tcggaaccta ttgtgagtga ataaccttgc ttcagagcca cc                        42

SEQ ID NO: 34           moltype = DNA  length = 40
FEATURE                 Location/Qualifiers
misc_feature            1..40
                        note = Staple Strand
source                  1..40
                        mol_type = other DNA
                        organism = synthetic construct
SEQUENCE: 34
cgtttgccaa ttcaccagtc acacgaccag ttcggtcata                           40

SEQ ID NO: 35           moltype = DNA  length = 40
FEATURE                 Location/Qualifiers
misc_feature            1..40
                        note = Staple Strand
source                  1..40
                        mol_type = other DNA
                        organism = synthetic construct
SEQUENCE: 35
aaacatagcg ccggaaacgt caccaatgaa taattttccc                           40

SEQ ID NO: 36           moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 36
acaatttcat taaggctcca aaaggagcct tttatacttc tg                        42

SEQ ID NO: 37           moltype = DNA  length = 40
FEATURE                 Location/Qualifiers
misc_feature            1..40
                        note = Staple Strand
source                  1..40
                        mol_type = other DNA
                        organism = synthetic construct
SEQUENCE: 37
gaacaaagaa tcagtagcga cagaatcaag ttgagtaaca                           40

SEQ ID NO: 38           moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 38
gataatacat ttgctttcga ggtgaatttc ttagccctaa aa                        42

SEQ ID NO: 39           moltype = DNA  length = 40
FEATURE                 Location/Qualifiers
misc_feature            1..40
                        note = Staple Strand
source                  1..40
                        mol_type = other DNA
                        organism = synthetic construct
SEQUENCE: 39
acagagatat agcgcgtttt catcggcatt taataaaagg                           40
```

SEQ ID NO: 40         moltype = DNA  length = 42
FEATURE               Location/Qualifiers
misc_feature          1..42
                      note = Staple Strand
source                1..42
                      mol_type = other DNA
                      organism = synthetic construct
SEQUENCE: 40
attttaaaag ttttgccttt agcgtcagac tggaaccctt ct                          42

SEQ ID NO: 41         moltype = DNA  length = 42
FEATURE               Location/Qualifiers
misc_feature          1..42
                      note = Staple Strand
source                1..42
                      mol_type = other DNA
                      organism = synthetic construct
SEQUENCE: 41
gacctgaaag ccggaaccag agccaccacc ggaacgttat ta                          42

SEQ ID NO: 42         moltype = DNA  length = 42
FEATURE               Location/Qualifiers
misc_feature          1..42
                      note = Staple Strand
source                1..42
                      mol_type = other DNA
                      organism = synthetic construct
SEQUENCE: 42
atcaaaatca cgtaagaata cgtggcacag acgttttgc tc                           42

SEQ ID NO: 43         moltype = DNA  length = 42
FEATURE               Location/Qualifiers
misc_feature          1..42
                      note = Staple Strand
source                1..42
                      mol_type = other DNA
                      organism = synthetic construct
SEQUENCE: 43
agtaccaggc gatggattat ttacattggc agtcttttca ta                          42

SEQ ID NO: 44         moltype = DNA  length = 42
FEATURE               Location/Qualifiers
misc_feature          1..42
                      note = Staple Strand
source                1..42
                      mol_type = other DNA
                      organism = synthetic construct
SEQUENCE: 44
aattcgacaa cgagaaggat taggattagc ggaatatttt tg                          42

SEQ ID NO: 45         moltype = DNA  length = 42
FEATURE               Location/Qualifiers
misc_feature          1..42
                      note = Staple Strand
source                1..42
                      mol_type = other DNA
                      organism = synthetic construct
SEQUENCE: 45
aatggctatt accgtactca ggaggtttag tactttacaa ac                          42

SEQ ID NO: 46         moltype = DNA  length = 42
FEATURE               Location/Qualifiers
misc_feature          1..42
                      note = Staple Strand
source                1..42
                      mol_type = other DNA
                      organism = synthetic construct
SEQUENCE: 46
taggtgtatc agtctttaat gcgcgaactg ataaacagct tg                          42

SEQ ID NO: 47         moltype = DNA  length = 42
FEATURE               Location/Qualifiers
misc_feature          1..42
                      note = Staple Strand
source                1..42
                      mol_type = other DNA
                      organism = synthetic construct
SEQUENCE: 47
ataccgatag tcgctcatgg aaatacctac attagcccgg aa                          42

| | | |
|---|---|---|
| SEQ ID NO: 48 | moltype = DNA length = 42 | |
| FEATURE | Location/Qualifiers | |
| misc_feature | 1..42 | |
| | note = Staple Strand | |
| source | 1..42 | |
| | mol_type = other DNA | |
| | organism = synthetic construct | |
| SEQUENCE: 48 | | |
| gtttatcagc ttgaggattt agaagtatta gaccgccacc ct | | 42 |

| | | |
|---|---|---|
| SEQ ID NO: 49 | moltype = DNA length = 42 | |
| FEATURE | Location/Qualifiers | |
| misc_feature | 1..42 | |
| | note = Staple Strand | |
| source | 1..42 | |
| | mol_type = other DNA | |
| | organism = synthetic construct | |
| SEQUENCE: 49 | | |
| cagaaccgcc atataatcct gattgtttgg ataattgtat cg | | 42 |

| | | |
|---|---|---|
| SEQ ID NO: 50 | moltype = DNA length = 42 | |
| FEATURE | Location/Qualifiers | |
| misc_feature | 1..42 | |
| | note = Staple Strand | |
| source | 1..42 | |
| | mol_type = other DNA | |
| | organism = synthetic construct | |
| SEQUENCE: 50 | | |
| agactcctca atcgtattaa atcctttgcc cgaaccgcct cc | | 42 |

| | | |
|---|---|---|
| SEQ ID NO: 51 | moltype = DNA length = 42 | |
| FEATURE | Location/Qualifiers | |
| misc_feature | 1..42 | |
| | note = Staple Strand | |
| source | 1..42 | |
| | mol_type = other DNA | |
| | organism = synthetic construct | |
| SEQUENCE: 51 | | |
| ctcagagccg ctatcatcat attcctgatt attaagaggc tg | | 42 |

| | | |
|---|---|---|
| SEQ ID NO: 52 | moltype = DNA length = 42 | |
| FEATURE | Location/Qualifiers | |
| misc_feature | 1..42 | |
| | note = Staple Strand | |
| source | 1..42 | |
| | mol_type = other DNA | |
| | organism = synthetic construct | |
| SEQUENCE: 52 | | |
| tcgctattaa taccatcgat agcagcaccg taaaccacca ga | | 42 |

| | | |
|---|---|---|
| SEQ ID NO: 53 | moltype = DNA length = 42 | |
| FEATURE | Location/Qualifiers | |
| misc_feature | 1..42 | |
| | note = Staple Strand | |
| source | 1..42 | |
| | mol_type = other DNA | |
| | organism = synthetic construct | |
| SEQUENCE: 53 | | |
| aggagcggaa tcaccctcag aaccgccacc ctctgtaaat cg | | 42 |

| | | |
|---|---|---|
| SEQ ID NO: 54 | moltype = DNA length = 42 | |
| FEATURE | Location/Qualifiers | |
| misc_feature | 1..42 | |
| | note = Staple Strand | |
| source | 1..42 | |
| | mol_type = other DNA | |
| | organism = synthetic construct | |
| SEQUENCE: 54 | | |
| aaatcaatat atattctgaa acatgaaagt atcagatgat gg | | 42 |

| | | |
|---|---|---|
| SEQ ID NO: 55 | moltype = DNA length = 42 | |
| FEATURE | Location/Qualifiers | |
| misc_feature | 1..42 | |
| | note = Staple Strand | |
| source | 1..42 | |
| | mol_type = other DNA | |
| | organism = synthetic construct | |
| SEQUENCE: 55 | | |

```
caattcatca accctcagaa ccgccaccct caaacagtac at                         42

SEQ ID NO: 56           moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 56
ggtatataa ccggctacag aggctttgag gacttaattg ag                          42

SEQ ID NO: 57           moltype = DNA   length = 40
FEATURE                 Location/Qualifiers
misc_feature            1..40
                        note = Staple Strand
source                  1..40
                        mol_type = other DNA
                        organism = synthetic construct
SEQUENCE: 57
taaggcgttc ccaattctgc gaacgagtag tgaaataccg                            40

SEQ ID NO: 58           moltype = DNA   length = 44
FEATURE                 Location/Qualifiers
misc_feature            1..44
                        note = Staple Strand
source                  1..44
                        mol_type = other DNA
                        organism = synthetic construct
SEQUENCE: 58
gcttaattgc taacgcaata ataacggaat acaggtcatt tttg                       44

SEQ ID NO: 59           moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 59
taatttcatc tacttcaaat atcgcgtttt aatcataatt ac                         42

SEQ ID NO: 60           moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 60
tagaaaaagc cgtttaccag acgacgataa aaatattta gt                          42

SEQ ID NO: 61           moltype = DNA   length = 44
FEATURE                 Location/Qualifiers
misc_feature            1..44
                        note = Staple Strand
source                  1..44
                        mol_type = other DNA
                        organism = synthetic construct
SEQUENCE: 61
agttgagatt tagactcctt attacgcagt atattattac aggt                       44

SEQ ID NO: 62           moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 62
aagacaaaga ataatcattg tgaattacct tatacaaatt ct                         42

SEQ ID NO: 63           moltype = DNA   length = 42
FEATURE                 Location/Qualifiers
misc_feature            1..42
                        note = Staple Strand
source                  1..42
                        mol_type = other DNA
                        organism = synthetic construct
```

-continued

```
SEQUENCE: 63
taccagtata atccatgtta cttagccgga acatccaatc gc                     42

SEQ ID NO: 64           moltype = DNA  length = 44
FEATURE                 Location/Qualifiers
misc_feature            1..44
                        note = Staple Strand
source                  1..44
                        mol_type = other DNA
                        organism = synthetic construct
SEQUENCE: 64
atctttgacc catacataaa ggtggcaaca taggcaaaag aata                   44

SEQ ID NO: 65           moltype = DNA  length = 40
FEATURE                 Location/Qualifiers
misc_feature            1..40
                        note = Staple Strand
source                  1..40
                        mol_type = other DNA
                        organism = synthetic construct
SEQUENCE: 65
aaccgaggag aatataatgc tgtagctcaa gccgaacaaa                        40

SEQ ID NO: 66           moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 66
ctaatatcag agcaccaacc taaaacgaaa gataaaagaa ac                     42

SEQ ID NO: 67           moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 67
ccactacgaa ggagataacc cacaagaatt gaaaacaaag ta                     42

SEQ ID NO: 68           moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 68
caacggagat tctattttgc acccagctac aaatacgtaa tg                     42

SEQ ID NO: 69           moltype = DNA  length = 40
FEATURE                 Location/Qualifiers
misc_feature            1..40
                        note = Staple Strand
source                  1..40
                        mol_type = other DNA
                        organism = synthetic construct
SEQUENCE: 69
tagaaggcta agtacggtgt ctggaagttt cccaatagca                        40

SEQ ID NO: 70           moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 70
caatcaataa tagtttccat taaacgggta aattttatcc tg                     42

SEQ ID NO: 71           moltype = DNA  length = 42
FEATURE                 Location/Qualifiers
misc_feature            1..42
                        note = Staple Strand
source                  1..42
                        mol_type = other DNA
```

```
                                organism = synthetic construct
SEQUENCE: 71
tttcatgagg acggctgtct ttccttatca ttgtgtcgaa at                       42

SEQ ID NO: 72           moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 72
ccgcgacctg cagccaacgc tcaacagtag ggctaaagac tt                       42

SEQ ID NO: 73           moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 73
aagattagtt gtgtatcatc gcctgataaa ttccaagaac gg                       42

SEQ ID NO: 74           moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 74
gtattaaacc aattatacca gtcaggacgt tggccttaaa tc                       42

SEQ ID NO: 75           moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 75
agaactggct cagtaccgca ctcatcgaga acagcaacac ta                       42

SEQ ID NO: 76           moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 76
tcataaccct ctgtttagta tcatatgcgt tatgcgattt ta                       42

SEQ ID NO: 77           moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 77
agcgaacctc cggaattacg aggcatagta agaagcaagc cg                       42

SEQ ID NO: 78           moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 78
tttttatttt cgaccggaag caaactccaa cagaggcgtt tt                       42

SEQ ID NO: 79           moltype = DNA  length = 42
FEATURE                 Location/Qualifiers
misc_feature            1..42
                        note = Staple Strand
source                  1..42
```

```
                        mol_type = other DNA
                        organism = synthetic construct
SEQUENCE: 79
aaagcgaacc aatcgtagga atcattaccg cgcattccat at                              42

SEQ ID NO: 80           moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 80
aacagttgat taaataagaa taaacaccgg aattcgagct tc                              42

SEQ ID NO: 81           moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 81
atatgcaact atatccggta ttctaagaac gcggtcagga tt                              42

SEQ ID NO: 82           moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 82
agagagtacc ttttaagaaa agtaagcaga tacatgtttt aa                              42

SEQ ID NO: 83           moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 83
taacgccaaa acgacttgcg ggaggttttg aaggaagaaa aa                              42

SEQ ID NO: 84           moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 84
tctacgttaa taagaaacaa tgaaatagca attgcagata ca                              42

SEQ ID NO: 85           moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 85
gtagaaaata cccagcgatt ataccaagcg cggttaagcc ca                              42

SEQ ID NO: 86           moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 86
ataataagag caaaacgaac taacggaaca acgttagcaa ac                              42

SEQ ID NO: 87           moltype = DNA   length = 42
FEATURE                 Location/Qualifiers
misc_feature            1..42
                        note = Staple Strand
```

```
                                    -continued source                  1..42
                        mol_type = other DNA
                        organism = synthetic construct
SEQUENCE: 87
tggcatgatt aaggaatacc acattcaact aaagctatct ta                    42

SEQ ID NO: 88           moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 88
ccgaagccct tttaattgct ccttttgata agccaaaaga ac                    42

SEQ ID NO: 89           moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 89
aagcccgaaa gtctgaccta aatttaatgg ttatttagtt tg                    42

SEQ ID NO: 90           moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 90
accattagat agattgcttt gaataccaag ttgattaaga gg                    42

SEQ ID NO: 91           moltype = DNA   length = 40
FEATURE                 Location/Qualifiers
misc_feature            1..40
                        note = Staple Strand
source                  1..40
                        mol_type = other DNA
                        organism = synthetic construct
SEQUENCE: 91
taaacagttt ttgattagta ataacatcac cattgaatcc                       40

SEQ ID NO: 92           moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 92
aatttcaact tcgcgagaaa acttttttcaa ataccaaaat ag                   42

SEQ ID NO: 93           moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 93
cgagaggctt tttattcatt tcaattacct gagagatggt tt                    42

SEQ ID NO: 94           moltype = DNA   length = 40
FEATURE                 Location/Qualifiers
misc_feature            1..40
                        note = Staple Strand
source                  1..40
                        mol_type = other DNA
                        organism = synthetic construct
SEQUENCE: 94
attcattaca actatcggcc ttgctggtaa agtaatcttg                       40

SEQ ID NO: 95           moltype = DNA   length = 42
FEATURE                 Location/Qualifiers
misc_feature            1..42
```

```
                        note = Staple Strand
source                  1..42
                        mol_type = other DNA
                        organism = synthetic construct
SEQUENCE: 95
gagggtagca atatatgtaa atgctgatgc aagaggcgca ga                              42

SEQ ID NO: 96           moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 96
cggtcaatca taacatcaag aaaacaaaat tagcatcgga ac                              42

SEQ ID NO: 97           moltype = DNA  length = 40
FEATURE                 Location/Qualifiers
misc_feature            1..40
                        note = Staple Strand
source                  1..40
                        mol_type = other DNA
                        organism = synthetic construct
SEQUENCE: 97
gattcgcctc atttcgcaaa tggtcaataa ttacatcggg                                 40

SEQ ID NO: 98           moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 98
aataatggaa gcaccctcag cagcgaaaga caattacatt ta                              42

SEQ ID NO: 99           moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 99
tgcgggatcg tggttagaac ctaccatatc aatttgaaag ag                              42

SEQ ID NO: 100          moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 100
gacagatgaa cactaacaac taatagatta gaaggccgct tt                              42

SEQ ID NO: 101          moltype = DNA  length = 40
FEATURE                 Location/Qualifiers
misc_feature            1..40
                        note = Staple Strand
source                  1..40
                        mol_type = other DNA
                        organism = synthetic construct
SEQUENCE: 101
ctcaaatatt tggggcgcga gctgaaaagg tctaaagcat                                 40

SEQ ID NO: 102          moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 102
catcgccatt actgaggctt gcagggagtt aagccgtcaa ta                              42

SEQ ID NO: 103          moltype = DNA  length = 42
FEATURE                 Location/Qualifiers
```

```
misc_feature              1..42
                          note = Staple Strand
source                    1..42
                          mol_type = other DNA
                          organism = synthetic construct
SEQUENCE: 103
atattcggtc gaaaataccg aacgaaccac caggctggct ga                         42

SEQ ID NO: 104            moltype = DNA  length = 42
FEATURE                   Location/Qualifiers
misc_feature              1..42
                          note = Staple Strand
source                    1..42
                          mol_type = other DNA
                          organism = synthetic construct
SEQUENCE: 104
ccttcatcaa gtatccagaa caatattacc gccataaccg at                         42

SEQ ID NO: 105            moltype = DNA  length = 42
FEATURE                   Location/Qualifiers
misc_feature              1..42
                          note = Staple Strand
source                    1..42
                          mol_type = other DNA
                          organism = synthetic construct
SEQUENCE: 105
tctttaggag cggtgtacag accaggcgca tagcagaaga ta                         42

SEQ ID NO: 106            moltype = DNA  length = 42
FEATURE                   Location/Qualifiers
misc_feature              1..42
                          note = Staple Strand
source                    1..42
                          mol_type = other DNA
                          organism = synthetic construct
SEQUENCE: 106
aaacagaggt ggctcattca gtgaataagg ctatctaaaa ta                         42

SEQ ID NO: 107            moltype = DNA  length = 42
FEATURE                   Location/Qualifiers
misc_feature              1..42
                          note = Staple Strand
source                    1..42
                          mol_type = other DNA
                          organism = synthetic construct
SEQUENCE: 107
gtaacaaagc taggcggtca gtattaacac cgtgcggaat cg                         42

SEQ ID NO: 108            moltype = DNA  length = 42
FEATURE                   Location/Qualifiers
misc_feature              1..42
                          note = Staple Strand
source                    1..42
                          mol_type = other DNA
                          organism = synthetic construct
SEQUENCE: 108
tcataaatat tttgcctgag tagaagaact caccaaatca ac                         42

SEQ ID NO: 109            moltype = DNA  length = 42
FEATURE                   Location/Qualifiers
misc_feature              1..42
                          note = Staple Strand
source                    1..42
                          mol_type = other DNA
                          organism = synthetic construct
SEQUENCE: 109
aaatcaacag tagactggat agcgtccaat accctgcaac ag                         42

SEQ ID NO: 110            moltype = DNA  length = 42
FEATURE                   Location/Qualifiers
misc_feature              1..42
                          note = Staple Strand
source                    1..42
                          mol_type = other DNA
                          organism = synthetic construct
SEQUENCE: 110
tgccacgctg aaatcaaaaa tcaggtcttt acgtcagttg gc                         42

SEQ ID NO: 111            moltype = DNA  length = 42
```

-continued

```
FEATURE                 Location/Qualifiers
misc_feature            1..42
                        note = Staple Strand
source                  1..42
                        mol_type = other DNA
                        organism = synthetic construct
SEQUENCE: 111
gaatgaccat agagccagca gcaaatgaaa aatggcatca at                              42

SEQ ID NO: 112          moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 112
tctactaata gtaaccgttg tagcaatact tccagaaaac ga                              42

SEQ ID NO: 113          moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 113
tatattttca tcaaaccctc aatcaatatc tgcctgacta tt                              42

SEQ ID NO: 114          moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 114
atagtcagaa gaatatacag taacagtacc ttcctgttta gc                              42

SEQ ID NO: 115          moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 115
gtaaaatgtt ttgaaaggaa ttgaggaagg tttgccctga cg                              42

SEQ ID NO: 116          moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 116
agaaacacca gaaataaaga aattgcgtag atgggggtaa ta                              42

SEQ ID NO: 117          moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 117
atgatgaaac aaagggaacc gaactgacca acaattattt gc                              42

SEQ ID NO: 118          moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 118
acgtaaaaca gaacgagtag taaattgggc ttgcaaaaga ag                              42
```

```
SEQ ID NO: 119           moltype = DNA  length = 42
FEATURE                  Location/Qualifiers
misc_feature             1..42
                         note = Staple Strand
source                   1..42
                         mol_type = other DNA
                         organism = synthetic construct
SEQUENCE: 119
gcagaggcga atgcaaaaga agttttgcca gatttcaggt tt                             42

SEQ ID NO: 120           moltype = DNA  length = 42
FEATURE                  Location/Qualifiers
misc_feature             1..42
                         note = Staple Strand
source                   1..42
                         mol_type = other DNA
                         organism = synthetic construct
SEQUENCE: 120
aacgtcagat gcaaagcgga ttgcatcaaa aaacaaaatc gc                             42

SEQ ID NO: 121           moltype = DNA  length = 42
FEATURE                  Location/Qualifiers
misc_feature             1..42
                         note = Staple Strand
source                   1..42
                         mol_type = other DNA
                         organism = synthetic construct
SEQUENCE: 121
cctcccgact tgcgggaggt tctgcattaa tgaatcggcc aa                             42

SEQ ID NO: 122           moltype = DNA  length = 42
FEATURE                  Location/Qualifiers
misc_feature             1..42
                         note = Staple Strand
source                   1..42
                         mol_type = other DNA
                         organism = synthetic construct
SEQUENCE: 122
taactcacat taattgcgtt gagaattaac tgaacaccct ga                             42

SEQ ID NO: 123           moltype = DNA  length = 42
FEATURE                  Location/Qualifiers
misc_feature             1..42
                         note = Staple Strand
source                   1..42
                         mol_type = other DNA
                         organism = synthetic construct
SEQUENCE: 123
aaaatgaaaa tagcagcctt tttaaatttt tgttaaatca gc                             42

SEQ ID NO: 124           moltype = DNA  length = 42
FEATURE                  Location/Qualifiers
misc_feature             1..42
                         note = Staple Strand
source                   1..42
                         mol_type = other DNA
                         organism = synthetic construct
SEQUENCE: 124
aacaggaaga ttgtataagc atacaatttt atcctgaatc tt                             42

SEQ ID NO: 125           moltype = DNA  length = 42
FEATURE                  Location/Qualifiers
misc_feature             1..42
                         note = Staple Strand
source                   1..42
                         mol_type = other DNA
                         organism = synthetic construct
SEQUENCE: 125
agttgctatt ttgcacccag caatatttaa attgtaaacg tt                             42

SEQ ID NO: 126           moltype = DNA  length = 42
FEATURE                  Location/Qualifiers
misc_feature             1..42
                         note = Staple Strand
source                   1..42
                         mol_type = other DNA
                         organism = synthetic construct
SEQUENCE: 126
aatatttgt taaaattcgc aacagagaga ataacataaa aa                              42
```

```
SEQ ID NO: 127          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 127
cagggaagcg cattagacgg gcgctcactg cccgctttcc ag                      42

SEQ ID NO: 128          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 128
tcgggaaacc tgtcgtgcca gttgaagcct taaatcaaga tt                      42

SEQ ID NO: 129          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 129
accaacgcta acgagcgtct ttgtcaatca tatgtacccc gg                      42

SEQ ID NO: 130          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 130
ggtcattgcc tgagagtctg gacgattttt tgtttaacgt ca                      42

SEQ ID NO: 131          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 131
ttatcccaat ccaaataaga aagcaaacaa gagaatcgat ga                      42

SEQ ID NO: 132          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 132
acggtaatcg taaaactagc atccagagcc taatttgcca gt                      42

SEQ ID NO: 133          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 133
ccgccaccct cagagccacc atttcatcaa cattaaatgt ga                      42

SEQ ID NO: 134          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 134
```

```
tcatttttta accaatagga agtagcgcgt tttcatcggc at                              42

SEQ ID NO: 135          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 135
aaccatcgat agcagcaccg ttggggtgcc taatgagtga gc                              42

SEQ ID NO: 136          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 136
agcttgcatg cctgcaggtc gtagttgcgc cgacaatgac aa                              42

SEQ ID NO: 137          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 137
tttcggtcat agccccctta tagagatcta caaaggctat ca                              42

SEQ ID NO: 138          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 138
cctcatatat tttaaatgca aaaaaaaggc tccaaaagga gc                              42

SEQ ID NO: 139          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 139
tttcacgttg aaaatctcca atgcctgagt aatgtgtagg ta                              42

SEQ ID NO: 140          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 140
aagattcaaa agggtgagaa atgagaatag aaaggaacaa ct                              42

SEQ ID NO: 141          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 141
tcatagttag cgtaacgatc ttggtcatag ctgtttcctg tg                              42

SEQ ID NO: 142          moltype = DNA   length = 42
FEATURE                 Location/Qualifiers
misc_feature            1..42
                        note = Staple Strand
source                  1..42
                        mol_type = other DNA
                        organism = synthetic construct
```

```
SEQUENCE: 142
ccgagctcga attcgtaatc aaaagttttg tcgtctttcc ag                          42

SEQ ID NO: 143         moltype = DNA  length = 42
FEATURE                Location/Qualifiers
misc_feature           1..42
                       note = Staple Strand
source                 1..42
                       mol_type = other DNA
                       organism = synthetic construct
SEQUENCE: 143
acgttagtaa atgaattttc ttctccgtgg gaacaaacgg cg                          42

SEQ ID NO: 144         moltype = DNA  length = 42
FEATURE                Location/Qualifiers
misc_feature           1..42
                       note = Staple Strand
source                 1..42
                       mol_type = other DNA
                       organism = synthetic construct
SEQUENCE: 144
gcgagtaaca acccgtcgga tgtatgggat tttgctaaac aa                          42

SEQ ID NO: 145         moltype = DNA  length = 42
FEATURE                Location/Qualifiers
misc_feature           1..42
                       note = Staple Strand
source                 1..42
                       mol_type = other DNA
                       organism = synthetic construct
SEQUENCE: 145
ctttaattgt atcggtttat ctcacgttgg tgtagatggg cg                          42

SEQ ID NO: 146         moltype = DNA  length = 42
FEATURE                Location/Qualifiers
misc_feature           1..42
                       note = Staple Strand
source                 1..42
                       mol_type = other DNA
                       organism = synthetic construct
SEQUENCE: 146
gattgaccgt aatgggatag gagcttgctt tcgaggtgaa tt                          42

SEQ ID NO: 147         moltype = DNA  length = 42
FEATURE                Location/Qualifiers
misc_feature           1..42
                       note = Staple Strand
source                 1..42
                       mol_type = other DNA
                       organism = synthetic construct
SEQUENCE: 147
ctttcaacag tttcagcgga gggccggaga cagtcaaatc ac                          42

SEQ ID NO: 148         moltype = DNA  length = 42
FEATURE                Location/Qualifiers
misc_feature           1..42
                       note = Staple Strand
source                 1..42
                       mol_type = other DNA
                       organism = synthetic construct
SEQUENCE: 148
catcaatatg atattcaacc gtcagagccg ccaccctcag aa                          42

SEQ ID NO: 149         moltype = DNA  length = 42
FEATURE                Location/Qualifiers
misc_feature           1..42
                       note = Staple Strand
source                 1..42
                       mol_type = other DNA
                       organism = synthetic construct
SEQUENCE: 149
ccaccaccgg aaccgcctcc cttctagctg ataaattaat gc                          42

SEQ ID NO: 150         moltype = DNA  length = 42
FEATURE                Location/Qualifiers
misc_feature           1..42
                       note = Staple Strand
source                 1..42
                       mol_type = other DNA
```

```
                           organism = synthetic construct
SEQUENCE: 150
tgaaattgtt atccgctcac agcattgaca ggaggttgag gc                42

SEQ ID NO: 151           moltype = DNA  length = 42
FEATURE                  Location/Qualifiers
misc_feature             1..42
                         note = Staple Strand
source                   1..42
                         mol_type = other DNA
                         organism = synthetic construct
SEQUENCE: 151
ccaccaccag agccgccgcc aattccacac aacatacgag cc                42

SEQ ID NO: 152           moltype = DNA  length = 42
FEATURE                  Location/Qualifiers
misc_feature             1..42
                         note = Staple Strand
source                   1..42
                         mol_type = other DNA
                         organism = synthetic construct
SEQUENCE: 152
tctggccttc ctgtagccag cccctcagag ccgccaccag aa                42

SEQ ID NO: 153           moltype = DNA  length = 42
FEATURE                  Location/Qualifiers
misc_feature             1..42
                         note = Staple Strand
source                   1..42
                         mol_type = other DNA
                         organism = synthetic construct
SEQUENCE: 153
cggagagggt agctattttt gtagcgtttg ccatcttttc at                42

SEQ ID NO: 154           moltype = DNA  length = 42
FEATURE                  Location/Qualifiers
misc_feature             1..42
                         note = Staple Strand
source                   1..42
                         mol_type = other DNA
                         organism = synthetic construct
SEQUENCE: 154
tcttaaacag cttgataccg aactctagag gatccccggg ta                42

SEQ ID NO: 155           moltype = DNA  length = 42
FEATURE                  Location/Qualifiers
misc_feature             1..42
                         note = Staple Strand
source                   1..42
                         mol_type = other DNA
                         organism = synthetic construct
SEQUENCE: 155
ggaagcataa agtgtaaagc caatcagtag cgacagaatc aa                42

SEQ ID NO: 156           moltype = DNA  length = 42
FEATURE                  Location/Qualifiers
misc_feature             1..42
                         note = Staple Strand
source                   1..42
                         mol_type = other DNA
                         organism = synthetic construct
SEQUENCE: 156
gtttgccttt agcgtcagac tcgccatcaa aaataattcg cg                42

SEQ ID NO: 157           moltype = DNA  length = 42
FEATURE                  Location/Qualifiers
misc_feature             1..42
                         note = Staple Strand
source                   1..42
                         mol_type = other DNA
                         organism = synthetic construct
SEQUENCE: 157
acaggtagaa agattcatca gactccagcc agctttccgg ca                42

SEQ ID NO: 158           moltype = DNA  length = 42
FEATURE                  Location/Qualifiers
misc_feature             1..42
                         note = Staple Strand
source                   1..42
```

```
                              mol_type = other DNA
                              organism = synthetic construct
SEQUENCE: 158
catcgtaacc gtgcatctgc ctggtttaat ttcaacttta at                    42

SEQ ID NO: 160          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 159
attcagtgaa taaggcttgc cgtaaaacga cggccagtgc ca                    42

SEQ ID NO: 160          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 160
cattgtgaat taccttatgc gaaggataaa aattttttaga ac                   42

SEQ ID NO: 161          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 161
tagcaaaatt aagcaataaa gtctactaat agtagtagca tt                    42

SEQ ID NO: 162          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 162
cgaacgagta gatttagttt gcgctattac gccagctggc ga                    42

SEQ ID NO: 163          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 163
ggcgatcggt gcgggcctct taccattaga tacatttcgc aa                    42

SEQ ID NO: 164          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 164
atggtcaata acctgtttag caggcaaagc gccattcgcc at                    42

SEQ ID NO: 165          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 165
ccgcttctgg tgccggaaac ctatattttc atttggggcg cg                    42

SEQ ID NO: 166          moltype = DNA   length = 42
FEATURE                 Location/Qualifiers
misc_feature            1..42
                        note = Staple Strand
```

```
source                  1..42
                        mol_type = other DNA
                        organism = synthetic construct
SEQUENCE: 166
agctgaaaag gtggcatcaa tcctcagagc ataaagctaa at                        42

SEQ ID NO: 167          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 167
cggttgtacc aaaaacatta taactaacgg aacaacatta tt                        42

SEQ ID NO: 168          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 168
aaaatctacg ttaataaaac ggaccctgta atacttttgc gg                        42

SEQ ID NO: 169          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 169
aaggggatg tgctgcaagg cacgccaaaa ggaattacga gg                         42

SEQ ID NO: 170          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 170
ttcaactaat gcagatacat agattaagtt gggtaacgcc ag                        42

SEQ ID NO: 171          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 171
tatcggcctc aggaagatcg cttgagattt aggaatacca ca                        42

SEQ ID NO: 172          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 172
gagaagcctt tatttcaacg cattttaaga actggctcat ta                        42

SEQ ID NO: 173          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 173
ggttttccca gtcacgacgt tctgacgaga aacaccagaa cg                        42

SEQ ID NO: 174          moltype = DNA   length = 42
FEATURE                 Location/Qualifiers
misc_feature            1..42
```

```
                        note = Staple Strand
source                  1..42
                        mol_type = other DNA
                        organism = synthetic construct
SEQUENCE: 174
agtagtaaat tgggcttgag aagtttgagg ggacgacgac ag                    42

SEQ ID NO: 175          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 175
tctttcctta tcattccaag acgtaaaaca gaaataaaga aa                    42

SEQ ID NO: 176          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 176
ttgtttggat tatacttctg aaaagttacc agaaggaaac cg                    42

SEQ ID NO: 177          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 177
aatgaaatag caatagctat caatggatta tttacattgg ca                    42

SEQ ID NO: 178          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 178
ccagccattg caacaggaaa agccgttttt attttcatcg ta                    42

SEQ ID NO: 179          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 179
gcactcatcg agaacaagca aacgctcatg gaaataccta ca                    42

SEQ ID NO: 180          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 180
ttttgacgct caatcgtctg attaccgaag ccctttttaa ga                    42

SEQ ID NO: 181          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 181
aaagtaagca gatagccgaa cataatggaa gggttagaac ct                    42

SEQ ID NO: 182          moltype = DNA   length = 42
FEATURE                 Location/Qualifiers
```

```
misc_feature            1..42
                        note = Staple Strand
source                  1..42
                        mol_type = other DNA
                        organism = synthetic construct
SEQUENCE: 182
accatatcaa aattatttgc aacgggtatt aaaccaagta cc                             42

SEQ ID NO: 183          moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 183
ggaatcatta ccgcgcccaa ttcaaactat cggccttgct gg                             42

SEQ ID NO: 184          moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 184
aattaaccgt tgtagcaata cccaataata agagcaagaa ac                             42

SEQ ID NO: 185          moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 185
acaaagtcag agggtaattg accgcctggc cctgagagag tt                             42

SEQ ID NO: 186          moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 186
tattgggcgc cagggtggtt taacgcgagg cgttttagcg aa                             42

SEQ ID NO: 187          moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 187
aggcttatcc ggtattctaa gttcttttca ccagtgagac gg                             42

SEQ ID NO: 188          moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 188
gcaacagctg attgcccttc agcgctaata tcagagagat aa                             42

SEQ ID NO: 189          moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 189
cccacaagaa ttgagttaag cttctttgat tagtaataac at                             42

SEQ ID NO: 190          moltype = DNA  length = 42
```

```
FEATURE                 Location/Qualifiers
misc_feature            1..42
                        note = Staple Strand
source                  1..42
                        mol_type = other DNA
                        organism = synthetic construct
SEQUENCE: 190
cacttgcctg agtagaagaa cagcaagcaa atcagatata ga                              42

SEQ ID NO: 191          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 191
ttccagtaag cgtcatacat gtgacctgaa agcgtaagaa ta                              42

SEQ ID NO: 192          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 192
gattcaccag tcacacgacc aaaggtgaat tatcaccgtc ac                              42

SEQ ID NO: 193          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 193
caaaagggcg acattcaacc gaattcatca atataatcct ga                              42

SEQ ID NO: 194          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 194
tttacaaaca attcgacaac tactttttca tgaggaagtt tc                              42

SEQ ID NO: 195          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 195
caaccatcgc ccacgcataa caaagaacgt ggactccaac gt                              42

SEQ ID NO: 196          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 196
gcagcaagcg gtccacgctg gggccggaaa cgtcaccaat ga                              42

SEQ ID NO: 197          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 197
cgacttgagc catttgggaa taaagagtct gtccatcacg ca                              42
```

```
SEQ ID NO: 198            moltype = DNA   length = 42
FEATURE                   Location/Qualifiers
misc_feature              1..42
                          note = Staple Strand
source                    1..42
                          mol_type = other DNA
                          organism = synthetic construct
SEQUENCE: 198
tggttgcttt gacgagcacg tcttttgcgg gatcgtcacc ct                          42

SEQ ID NO: 199            moltype = DNA   length = 42
FEATURE                   Location/Qualifiers
misc_feature              1..42
                          note = Staple Strand
source                    1..42
                          mol_type = other DNA
                          organism = synthetic construct
SEQUENCE: 199
cttgcaggga gttaaaggcc gataacgtgc tttcctcgtt ag                          42

SEQ ID NO: 200            moltype = DNA   length = 42
FEATURE                   Location/Qualifiers
misc_feature              1..42
                          note = Staple Strand
source                    1..42
                          mol_type = other DNA
                          organism = synthetic construct
SEQUENCE: 200
aatcagagcg ggagctaaac accgtaacac tgagtttcgt ca                          42

SEQ ID NO: 201            moltype = DNA   length = 42
FEATURE                   Location/Qualifiers
misc_feature              1..42
                          note = Staple Strand
source                    1..42
                          mol_type = other DNA
                          organism = synthetic construct
SEQUENCE: 201
ggaggtttag taccgccacc ctgagtaaca ttatcatttt gc                          42

SEQ ID NO: 202            moltype = DNA   length = 42
FEATURE                   Location/Qualifiers
misc_feature              1..42
                          note = Staple Strand
source                    1..42
                          mol_type = other DNA
                          organism = synthetic construct
SEQUENCE: 202
acgttattaa ttttaaaagt ttcagaaccg ccaccctcag aa                          42

SEQ ID NO: 203            moltype = DNA   length = 42
FEATURE                   Location/Qualifiers
misc_feature              1..42
                          note = Staple Strand
source                    1..42
                          mol_type = other DNA
                          organism = synthetic construct
SEQUENCE: 203
ccgccaccct cagagccacc agaatggcta ttagtcttta at                          42

SEQ ID NO: 204            moltype = DNA   length = 42
FEATURE                   Location/Qualifiers
misc_feature              1..42
                          note = Staple Strand
source                    1..42
                          mol_type = other DNA
                          organism = synthetic construct
SEQUENCE: 204
cgtggcacag acaatatttt tccctcattt tcagggatag ca                          42

SEQ ID NO: 205            moltype = DNA   length = 42
FEATURE                   Location/Qualifiers
misc_feature              1..42
                          note = Staple Strand
source                    1..42
                          mol_type = other DNA
                          organism = synthetic construct
SEQUENCE: 205
cagcagcgaa agacagcatc gacatcgcca ttaaaaatac cg                          42
```

SEQ ID NO: 206          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 206
gcgcgaactg atagccctaa agaacgaggg tagcaacggc ta                               42

SEQ ID NO: 207          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 207
agcccaatag gaacccatgt aggaggccga ttaaagggat tt                               42

SEQ ID NO: 208          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 208
atcaaaagaa tagcccgaga tgtagcattc cacagacagc cc                               42

SEQ ID NO: 209          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 209
ccagtacaaa ctacaacgcc tagggttgag tgttgttcca gt                               42

SEQ ID NO: 210          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 210
tagacaggaa cggtacgcca ggcgcagtct ctgaatttac cg                               42

SEQ ID NO: 211          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 211
aggtcagacg attggccttg aaatcggcaa atcccttat aa                                42

SEQ ID NO: 212          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 212
cctgtttgat ggtggttccg atattcacaa acaaataaat cc                               42

SEQ ID NO: 213          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 213 tcattaaagc cagaatggaa aaatcctgag aagtgttttt at                         42

SEQ ID NO: 214          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 214
ggaacaaaga aaccaccaga agggtcagtg ccttgagtaa ca                         42

SEQ ID NO: 215          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 215
tactggtaat aagttttaac gggagcggaa ttatcatcat at                         42

SEQ ID NO: 216          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 216
ccaacagaga tagaacccctt cgcttttgat gatacaggag tg                        42

SEQ ID NO: 217          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 217
aatcagtgag gccaccgagt atagagccag caaaatcacc ag                         42

SEQ ID NO: 218          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 218
tagcaccatt accattagca atttgcccca gcaggcgaaa at                         42

SEQ ID NO: 219          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 219
ttggaacaag agtccactat tcgatatatt cggtcgctga gg                         42

SEQ ID NO: 220          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 220
cagaggcttt gaggactaaa gcgtattaaa tcctttgccc ga                         42

SEQ ID NO: 221          moltype = DNA   length = 42
FEATURE                 Location/Qualifiers
misc_feature            1..42
                        note = Staple Strand
source                  1..42
                        mol_type = other DNA
                        organism = synthetic construct

```
SEQUENCE: 221
tcctgattat cagatgatgg cattgaggga gggaaggtaa at                              42

SEQ ID NO: 222           moltype = DNA   length = 42
FEATURE                  Location/Qualifiers
misc_feature             1..42
                         note = Staple Strand
source                   1..42
                         mol_type = other DNA
                         organism = synthetic construct
SEQUENCE: 222
attgacggaa attattcatt agtaataaaa gggacattct gg                              42

SEQ ID NO: 223           moltype = DNA   length = 42
FEATURE                  Location/Qualifiers
misc_feature             1..42
                         note = Staple Strand
source                   1..42
                         mol_type = other DNA
                         organism = synthetic construct
SEQUENCE: 223
tttgccagag ggggtaatag tgtgccacgc tgagagccag ca                              42

SEQ ID NO: 224           moltype = DNA   length = 42
FEATURE                  Location/Qualifiers
misc_feature             1..42
                         note = Staple Strand
source                   1..42
                         mol_type = other DNA
                         organism = synthetic construct
SEQUENCE: 224
aacgaaccac cagcagaaga tatgaacggt gtacagacca gg                              42

SEQ ID NO: 225           moltype = DNA   length = 42
FEATURE                  Location/Qualifiers
misc_feature             1..42
                         note = Staple Strand
source                   1..42
                         mol_type = other DNA
                         organism = synthetic construct
SEQUENCE: 225
cggaacgagg cgcagacggt cgaggattta gaagtattag ac                              42

SEQ ID NO: 226           moltype = DNA   length = 42
FEATURE                  Location/Qualifiers
misc_feature             1..42
                         note = Staple Strand
source                   1..42
                         mol_type = other DNA
                         organism = synthetic construct
SEQUENCE: 226
caaagggcga aaaaccgtct aatcaacgta acaaagctgc tc                              42

SEQ ID NO: 227           moltype = DNA   length = 42
FEATURE                  Location/Qualifiers
misc_feature             1..42
                         note = Staple Strand
source                   1..42
                         mol_type = other DNA
                         organism = synthetic construct
SEQUENCE: 227
cgcataggct ggctgaccct cgccgctaca gggcgcgtac ta                              42

SEQ ID NO: 228           moltype = DNA   length = 42
FEATURE                  Location/Qualifiers
misc_feature             1..42
                         note = Staple Strand
source                   1..42
                         mol_type = other DNA
                         organism = synthetic construct
SEQUENCE: 228
cgtggcgaga aaggaaggga aatatgcaac taaagtacgg tg                              42

SEQ ID NO: 229           moltype = DNA   length = 42
FEATURE                  Location/Qualifiers
misc_feature             1..42
                         note = Staple Strand
source                   1..42
                         mol_type = other DNA
```

-continued

```
                        organism = synthetic construct
SEQUENCE: 229
aggattagag agtacccttta agaaaggaat tgaggaaggt ta                         42

SEQ ID NO: 230          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 230
tcagttggca aatcaacagt tttgctcctt ttgataagag gt                          42

SEQ ID NO: 231          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 231
cattttgcg gatggcttag atcaccttgc tgaacctcaa at                           42

SEQ ID NO: 232          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 232
gcaaatgaaa aatctaaagc agcttaattg ctgaatataa tg                          42

SEQ ID NO: 233          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 233
ctgtagctca acatgtttta agaaagcgaa aggagcgggc gc                          42

SEQ ID NO: 234          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 234
taaagcacta aatcggaacc caacagttga ttcccaattc tg                          42

SEQ ID NO: 235          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 235
tctggaagtt tcattccata ttaaagggag cccccgattt ag                          42

SEQ ID NO: 236          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 236
tagggcgctg gcaagtgtag cagaggcttt tgcaaaagaa gt                          42

SEQ ID NO: 237          moltype = DNA   length = 42
FEATURE                 Location/Qualifiers
misc_feature            1..42
                        note = Staple Strand
source                  1..42
```

```
                        mol_type = other DNA
                        organism = synthetic construct
SEQUENCE: 237
catagtaaga gcaacactat cttttttggg gtcgaggtgc cg                    42

SEQ ID NO: 238          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 238
tgaaccatca cccaaatcaa gataaccctc gtttaccaga cg                    42

SEQ ID NO: 239          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 239
acgataaaaa ccaaaatagc gggtcacgct gcgcgtaacc ac                    42

SEQ ID NO: 240          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 240
tctaaaatat ctttaggagc aataaatatt cattgaatcc cc                    42

SEQ ID NO: 241          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 241
gtccaatact gcggaatcgt cctaacaact aatagattag ag                    42

SEQ ID NO: 242          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 242
gtattaacac cgcctgcaac aaaaatgttt agactggata gc                    42

SEQ ID NO: 243          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 243
cacacccgcc gcgcttaatg catcaagagt aatcttgaca ag                    42

SEQ ID NO: 244          moltype = DNA   length = 42
FEATURE                 Location/Qualifiers
misc_feature            1..42
                        note = Staple Strand
source                  1..42
                        mol_type = other DNA
                        organism = synthetic construct
SEQUENCE: 244
aaccggatat tcattaccca atcagggcga tggcccacta cg                    42

SEQ ID NO: 245          moltype = DNA   length = 42
FEATURE                 Location/Qualifiers
misc_feature            1..42
                        note = Staple Strand
```

```
source                      1..42
                            mol_type = other DNA
                            organism = synthetic construct
SEQUENCE: 245
ccgtcaatag ataatacatt taatcataag ggaaccgaac tg                    42

SEQ ID NO: 246              moltype = DNA   length = 42
FEATURE                     Location/Qualifiers
misc_feature                1..42
                            note = Staple Strand
source                      1..42
                            mol_type = other DNA
                            organism = synthetic construct
SEQUENCE: 246
accaactttg aaagaggaca gaaaacagag gtgaggcggt ca                    42

SEQ ID NO: 247              moltype = DNA   length = 42
FEATURE                     Location/Qualifiers
misc_feature                1..42
                            note = Staple Strand
source                      1..42
                            mol_type = other DNA
                            organism = synthetic construct
SEQUENCE: 247
atcaacaata gataagtcct gtgtccagac gacgacaata aa                    42

SEQ ID NO: 248              moltype = DNA   length = 42
FEATURE                     Location/Qualifiers
misc_feature                1..42
                            note = Staple Strand
source                      1..42
                            mol_type = other DNA
                            organism = synthetic construct
SEQUENCE: 248
gcagaggcat tttcgagcca ggtatgttag caaacgtaga aa                    42

SEQ ID NO: 249              moltype = DNA   length = 42
FEATURE                     Location/Qualifiers
misc_feature                1..42
                            note = Staple Strand
source                      1..42
                            mol_type = other DNA
                            organism = synthetic construct
SEQUENCE: 249
aggaaacgca ataataacgg attgctttga ataccaagtt ac                    42

SEQ ID NO: 250              moltype = DNA   length = 42
FEATURE                     Location/Qualifiers
misc_feature                1..42
                            note = Staple Strand
source                      1..42
                            mol_type = other DNA
                            organism = synthetic construct
SEQUENCE: 250
gtcagatgaa tatacagtaa caaaccaatc aataatcggc tg                    42

SEQ ID NO: 251              moltype = DNA   length = 42
FEATURE                     Location/Qualifiers
misc_feature                1..42
                            note = Staple Strand
source                      1..42
                            mol_type = other DNA
                            organism = synthetic construct
SEQUENCE: 251
tcctaattta cgagcatgta gagtaccttt tacatcggga ga                    42

SEQ ID NO: 252              moltype = DNA   length = 42
FEATURE                     Location/Qualifiers
misc_feature                1..42
                            note = Staple Strand
source                      1..42
                            mol_type = other DNA
                            organism = synthetic construct
SEQUENCE: 252
aacaataacg gattcgcctg aatacccaaa agaactggca tg                    42

SEQ ID NO: 253              moltype = DNA   length = 42
FEATURE                     Location/Qualifiers
misc_feature                1..42
```

```
                            note = Staple Strand
source                      1..42
                            mol_type = other DNA
                            organism = synthetic construct
SEQUENCE: 253
attaagactc cttattacgc ataataagag aatataaagt ac                              42

SEQ ID NO: 254              moltype = DNA  length = 42
FEATURE                     Location/Qualifiers
misc_feature                1..42
                            note = Staple Strand
source                      1..42
                            mol_type = other DNA
                            organism = synthetic construct
SEQUENCE: 254
cgacaaaagg taaagtaatt caacaagaaa aataatatcc ca                              42

SEQ ID NO: 255              moltype = DNA  length = 42
FEATURE                     Location/Qualifiers
misc_feature                1..42
                            note = Staple Strand
source                      1..42
                            mol_type = other DNA
                            organism = synthetic construct
SEQUENCE: 255
cattaaacgg gtaaaatacg ttgagtgaat aaccttgctt ct                              42

SEQ ID NO: 256              moltype = DNA  length = 42
FEATURE                     Location/Qualifiers
misc_feature                1..42
                            note = Staple Strand
source                      1..42
                            mol_type = other DNA
                            organism = synthetic construct
SEQUENCE: 256
aaaatcgcgc agaggcgaat tatggtttac cagcgccaaa ga                              42

SEQ ID NO: 257              moltype = DNA  length = 42
FEATURE                     Location/Qualifiers
misc_feature                1..42
                            note = Staple Strand
source                      1..42
                            mol_type = other DNA
                            organism = synthetic construct
SEQUENCE: 257
ataaagaaa cgcaaagaca ccaacgccaa catgtaattt ag                               42

SEQ ID NO: 258              moltype = DNA  length = 42
FEATURE                     Location/Qualifiers
misc_feature                1..42
                            note = Staple Strand
source                      1..42
                            mol_type = other DNA
                            organism = synthetic construct
SEQUENCE: 258
gtgataaata aggcgttaaa tagaatacac taaaacactc at                              42

SEQ ID NO: 259              moltype = DNA  length = 42
FEATURE                     Location/Qualifiers
misc_feature                1..42
                            note = Staple Strand
source                      1..42
                            mol_type = other DNA
                            organism = synthetic construct
SEQUENCE: 259
acctaaaacg aaagaggcaa aaagaataaa caccggaatc at                              42

SEQ ID NO: 260              moltype = DNA  length = 42
FEATURE                     Location/Qualifiers
misc_feature                1..42
                            note = Staple Strand
source                      1..42
                            mol_type = other DNA
                            organism = synthetic construct
SEQUENCE: 260
aattactaga aaaagcctgt tggataagtg ccgtcgagag gg                              42

SEQ ID NO: 261              moltype = DNA  length = 42
FEATURE                     Location/Qualifiers
```

| | |
|---|---|
| misc_feature | 1..42 |
| | note = Staple Strand |
| source | 1..42 |
| | mol_type = other DNA |
| | organism = synthetic construct |

SEQUENCE: 261
gggttttgct cagtaccagg ctagtatcat atgcgttata ca          42

| | |
|---|---|
| SEQ ID NO: 262 | moltype = DNA  length = 42 |
| FEATURE | Location/Qualifiers |
| misc_feature | 1..42 |
| | note = Staple Strand |
| source | 1..42 |
| | mol_type = other DNA |
| | organism = synthetic construct |

SEQUENCE: 262
tacatttaac aatttcattt gataggtgta tcaccgtact ca          42

| | |
|---|---|
| SEQ ID NO: 263 | moltype = DNA  length = 42 |
| FEATURE | Location/Qualifiers |
| misc_feature | 1..42 |
| | note = Staple Strand |
| source | 1..42 |
| | mol_type = other DNA |
| | organism = synthetic construct |

SEQUENCE: 263
ttgatataag tatagcccgg aaattacctt ttttaatgga aa          42

| | |
|---|---|
| SEQ ID NO: 264 | moltype = DNA  length = 42 |
| FEATURE | Location/Qualifiers |
| misc_feature | 1..42 |
| | note = Staple Strand |
| source | 1..42 |
| | mol_type = other DNA |
| | organism = synthetic construct |

SEQUENCE: 264
aattcttacc agtataaagc cgtattaaga ggctgagact cc          42

| | |
|---|---|
| SEQ ID NO: 265 | moltype = DNA  length = 42 |
| FEATURE | Location/Qualifiers |
| misc_feature | 1..42 |
| | note = Staple Strand |
| source | 1..42 |
| | mol_type = other DNA |
| | organism = synthetic construct |

SEQUENCE: 265
gtgcccgtat aaacagttaa tcatcaagaa aacaaaatta at          42

| | |
|---|---|
| SEQ ID NO: 266 | moltype = DNA  length = 42 |
| FEATURE | Location/Qualifiers |
| misc_feature | 1..42 |
| | note = Staple Strand |
| source | 1..42 |
| | mol_type = other DNA |
| | organism = synthetic construct |

SEQUENCE: 266
aaaagaagat gatgaaacaa agccccctgc ctatttcgga ac          42

| | |
|---|---|
| SEQ ID NO: 267 | moltype = DNA  length = 42 |
| FEATURE | Location/Qualifiers |
| misc_feature | 1..42 |
| | note = Staple Strand |
| source | 1..42 |
| | mol_type = other DNA |
| | organism = synthetic construct |

SEQUENCE: 267
ctattattct gaaacatgaa aaacgctcaa cagtagggct ta          42

| | |
|---|---|
| SEQ ID NO: 268 | moltype = DNA  length = 42 |
| FEATURE | Location/Qualifiers |
| misc_feature | 1..42 |
| | note = Staple Strand |
| source | 1..42 |
| | mol_type = other DNA |
| | organism = synthetic construct |

SEQUENCE: 268
attgagaatc gccatatttta acacggaata agtttatttt gt          42

| | |
|---|---|
| SEQ ID NO: 269 | moltype = DNA  length = 42 |

```
FEATURE                 Location/Qualifiers
misc_feature            1..42
                        note = Staple Strand
source                  1..42
                        mol_type = other DNA
                        organism = synthetic construct
SEQUENCE: 269
cacaatcaat agaaaattca tattcatttc aattacctga gc                              42

SEQ ID NO: 270          moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 270
cagtacataa atcaatatat gaatgccact acgaaggcac ca                              42

SEQ ID NO: 271          moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 271
gtaaatcgtc gctattaatt aacctgctcc atgttactta gc                              42

SEQ ID NO: 272          moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 272
agcgcgaaac aaagtacaac gatggtttga aataccgacc gt                              42

SEQ ID NO: 273          moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 273
tataactata tgtaaatgct gcaaatatcg cgttttaatt cg                              42

SEQ ID NO: 274          moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 274
aagaggaagc ccgaaagact tatgcaaatc caatcgcaag ac                              42

SEQ ID NO: 275          moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 275
tagtgaattt atcaaaatca tggaagcaaa ctccaacagg tc                              42

SEQ ID NO: 276          moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 276
agcttcaaag cgaaccagac caggtctgag agactacctt tt                              42
```

```
SEQ ID NO: 277          moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 277
aaagaacgcg agaaaacttt tctgactatt atagtcagaa gc                    42

SEQ ID NO: 278          moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 278
ctcaaatgct ttaaacagtt ctaagacgct gagaagagtc aa                    42

SEQ ID NO: 279          moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 279
aaacatagcg atagcttaga tagaaaacga gaatgaccat aa                    42

SEQ ID NO: 280          moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 280
atcaaaaatc aggtctttac ctcaaatata ttttagttaa tt                    42

SEQ ID NO: 281          moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 281
tcatcttctg acctaaattt agagatttgt atcatcgcct ga                    42

SEQ ID NO: 282          moltype = DNA  length = 42
FEATURE                 Location/Qualifiers
misc_feature            1..42
                        note = Staple Strand
source                  1..42
                        mol_type = other DNA
                        organism = synthetic construct
SEQUENCE: 282
taaattgtgt cgaaatccgc gattttccct tagaatcctt ga                    42
```

DNA GRIDIRON COMPOSITIONS AND METHODS

CROSS-REFERENCE TO RELATED APPLICATIONS

This application is a continuation of U.S. patent application Ser. No. 16/938,474, filed on Jul. 24, 2020, which was a continuation of U.S. patent application Ser. No. 16/202,841, filed on Nov. 28, 2018, which is a continuation of U.S. patent application Ser. No. 15/121,007, filed on Aug. 23, 2016, which is a national stage entry of International Patent Application No. PCT/US2015/017553, filed on Feb. 25, 2015, which claims priority to U.S. Provisional Patent Application No. 61/944,677 filed on Feb. 26, 2014.

STATEMENT OF GOVERNMENT RIGHTS

This invention was made with government support under N000140911118 awarded by the Office of Naval Research, 1104373 awarded by the National Science Foundation, and W911NF-11-1-0137 awarded by the Army Research Office. The government has certain rights in the invention.

SEQUENCE LISTING

The instant application contains a Sequence Listing which has been submitted electronically in XML file format and is hereby incorporated by reference in its entirety. Said XML copy, created on Jun. 16, 2023, is named G8118-00305_SL.xml and is 362, 165 bytes in size.

FIELD OF THE INVENTION

This disclosure relates to the field of nanotechnology and more particularly to the engineering of wireframe architectures and scaffolds using DNA structures.

BACKGROUND OF THE INVENTION

Self-assembling nucleic acid molecules have shown merit as versatile materials for organizing and constructing complex nano-scale structures. Methods are known for generation of complex DNA origami nanostructures with addressable surface features. For example, a long scaffold strand, most often the 7429-nucleotide (nt) circular genome of the M13mp18 bacteriophage, is organized and folded by interactions with a large number of short, synthetic, staple strands. The path of the scaffold strand in this approach has been restricted to discrete domains of parallel lines because it is based on the double crossover unit motif to link adjacent helices.

Because engineering wireframe architectures and scaffolds of increasing complexity is an important challenge in nanotechology, methods and compositions for achieving same are very useful and inventive.

SUMMARY OF THE INVENTION

We present a design strategy that uses an unusual set of immobile Holliday junction analogs (four-arm junctions) as the basic structural unit of DNA origami nanostructures and as joints to construct a variety of two-dimensional (2D) and 3D gridiron structures, in which the scaffold strand and corresponding double helices are not restricted to a 1D parallel, raster-fill pattern. By programming the connection between individual joints with DNA segments of variable lengths, we constructed complex wireframe geometries.

These and other aspects of the invention will be apparent upon reference to the following detailed description and figures. To that end, any patent and other documents cited herein are hereby incorporated by reference in their entirety.

BRIEF DESCRIPTION OF THE FIGURES

The patent application file contains at least one drawing executed in color. Copies of this patent or patent application publication with color drawing(s) will be provided by the Office upon request and payment of the necessary fee.

DETAILED DESCRIPTION OF THE PREFERRED EMBODIMENTS

Although intuitively one could imagine threading a single-stranded scaffold through a number of four-arm junction units in both horizontal and vertical directions to create gridiron like patterns, the structural properties of traditional Holliday junction impose certain challenges that require unconventional rearrangement of the junction unit conformation, as revealed by the design principles described below.

We compared a gridiron unit to a double crossover motif (FIG. 1A), and the DNA strands are abstracted to display only their polarity with the arrows pointing from 5' to 3'. In the gridiron unit, four four-arm junctions are linked together to form a two-layer square frame in which the helices on opposite sides lie in the same plane. An antiparallel arrangement between opposite sides of the square frame permits a single, central strand to traverse each of the helices.

Figure 1:
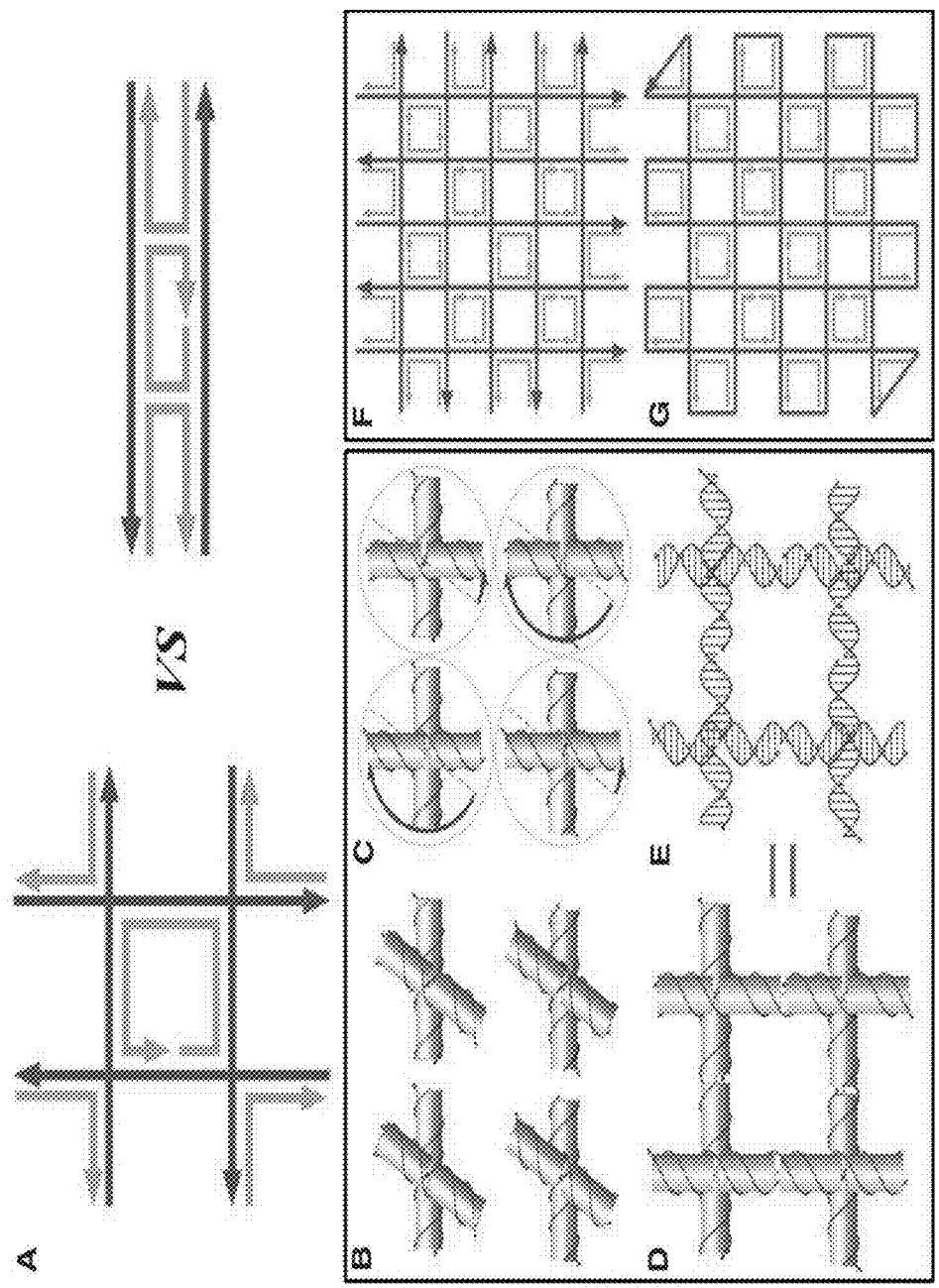
FIG. 1. (A) (Left) Geometry and strand polarity of a single gridiron unit formed from four four-arm junctions. (Right) Geometry and polarity of a double-crossover molecule motif used in conventional DNA origami structures. For both structures, the ssDNAs depicted in red are components of DNA double helices that serve as the scaffold strands. The ssDNA depicted in gray represents staple strands. (B) Models of four four-arm junction molecules in their relaxed conformation. The orientation of the upper two junctions differs from that of the lower two by a 180° in-plane rotation. Thus, the polarities of the continuous red strands in the upper and lower layers of the horizontally oriented helices are antiparallel to one another. (C) Models illustrating the deviation from a relaxed conformation required of the four individual junctions to form a gridiron unit. The blue arrows indicate that the top helix of the junctions in the upper-left and lower-right corners must be rotated ~150° clockwise, whereas in the upper-right and lower-left junctions they must be rotated ~30° counterclockwise. (D and E) Helical models illustrating a complete gridiron unit. (F and G) Schematics illustrating a typical scaffold-folding path for a 2D DNA gridiron pattern.

Each of the four junctions is depicted in its relaxed conformation (FIG. 1B) such that the helices form a right-handed twist with a 60° torsion angle. Deviation from a relaxed conformation is required of each junction to form the gridiron unit cell. First, the red strands in the horizontally oriented helices (both top and bottom images) can be linked together to produce continuous strands without reversing the 5'-to-3' polarity (FIG. 1B-C). Next, the vertically oriented helices need to be rotated in the plane about the junction points (FIG. 1C) to allow the formation of continuous 5'-to-3' connections between upper and lower junctions (FIG. 1D-E).

Connecting a number of gridiron units leads to the formation of a variety of 2D lattices (FIG. 1F-G). The red lines represent the DNA strands that are expected to retain an unperturbed helical structure with continuous base stacking. Meanwhile, the short strands (in gray) form the crossovers between helical domains and function as staples. A long scaffold strand is created by connecting the termini of the red strands with short single-stranded DNA (ssDNA) loops. In the most basic design, the scaffold begins at one corner, fills the first layer, changes direction at the opposite corner, and then fills the second layer to produce a structure in which the helices within the two layers are oriented perpendicularly with respect to each other. Lastly, the scaffold returns to its initial position to form a closed loop (FIG. 1G).

Figure 2:
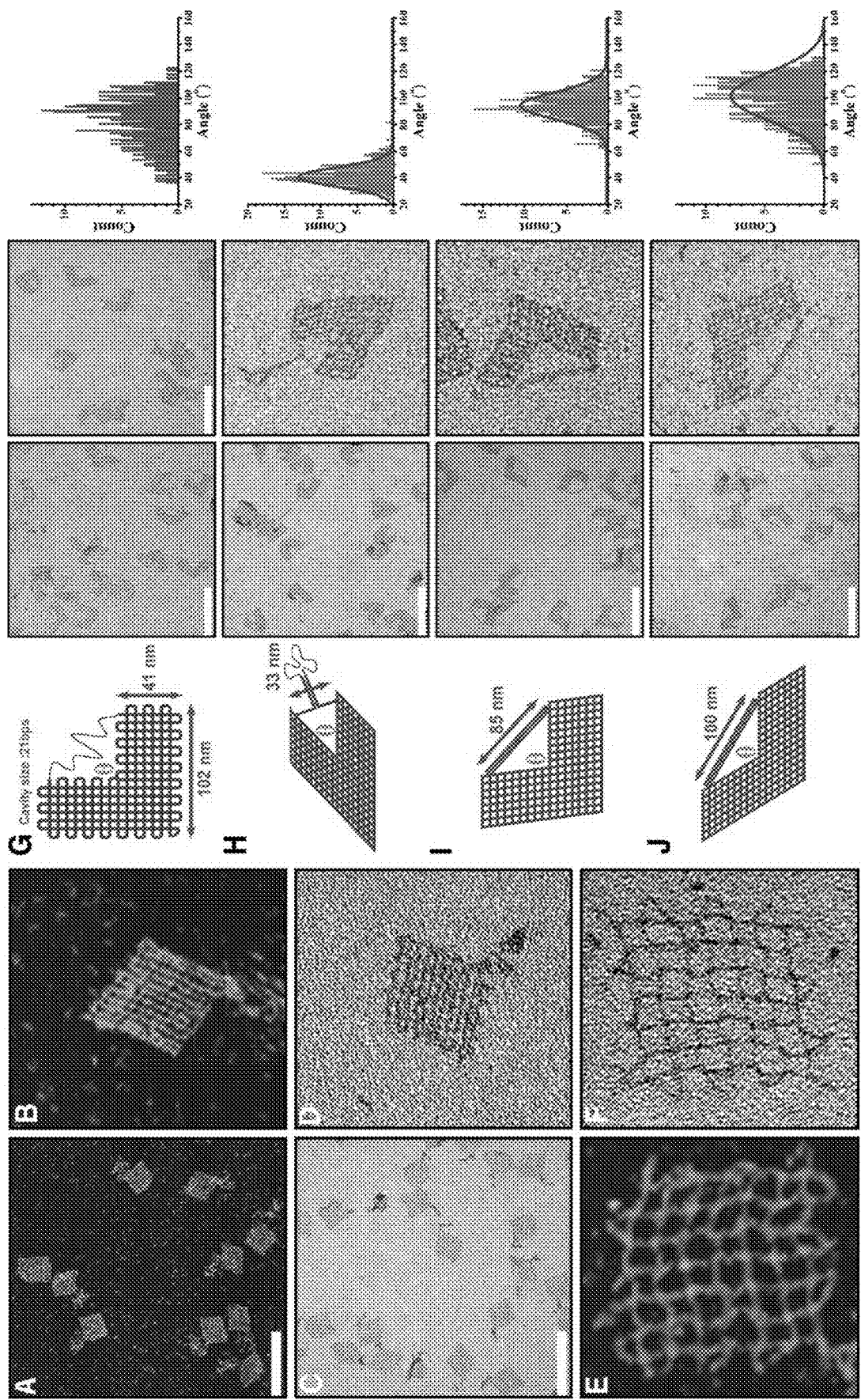
FIG. 2. (A to D) Images for a 2D gridiron structures with 21-bp cavities with AFM [(A) and (B)] and TEM images [(C) and (D)]. (E and F) Images for a 2D gridiron with 63-bp cavities with AFM (E) and TEM images (F). (G to J) Schematics (left), TEM images (middle), and histogram analysis (right) of the angle distributions for angle control. All scale bars indicate 200 nm, and all zoom-in images (images without scale bars) are 200 by 200 nm.

The cavity size of gridiron structures can be tailored by altering the number of base pairs between the adjacent junction points. An 11-by-11 gridiron structure (11 vertical helices by 11 horizontal helices) with 21 base pairs (bp) between junctions in both directions uses 5301 of 7249 nt of the M13mp18 ssDNA scaffold strand and contains 120 staple strands (42 nt each). The remaining 1948 nt of the scaffold form a single-stranded loop at one corner that is visible in atomic force microscope (AFM, FIG. 2, A and B) and transmission electron microscope (TEM) images (FIG. 2C-D). Gridiron structures with 63-by-63-bp cavities (FIG. 2E-F) were assembled to demonstrate the programmability of the design strategy.

To test whether the ssDNA scaffold is required to force the junction to rotate and form the intended gridiron structures, we designed and successfully constructed a scaffold-free 11-by-11 gridiron structure. We also found that scaffolded and scaffold-free gridiron elements can be combined within a single structure. Further, a scaffold-free gridiron unit was examined by native gel electrophoresis to verify its formation when the component strands were mixed in equal stoichiometric ratios. Although the schematic diagram in FIG. 1D depicts 90° angles between the helices in the upper and lower layers, the angles are not fixed because the junctions are flexible. The experimental results reveal the formation of rhomboid rather than square structures; the junctions most likely behave cooperatively in order to maintain optimized base-stacking interactions and the lowest overall free energy. The single-stranded scaffold loop in one corner serves as an intrinsic marker to determine the angles adopted by the gridiron, and the angles display a bimodal distribution with nearly equal amplitudes, centered at 76° T 7° (SD) and 103° T 7°.

The flexibility of the joints makes it possible to control or reconfigure the conformation of the gridiron structure by exerting external forces on selected corners of a gridiron. A modified version of a 15-by-15 gridiron structure with 21-bp cavities has about one quadrant of the gridiron unfolded and forms a randomly coiled 836-nt single-stranded loop between two "arms" of tweezers (FIG. 2G). The ssDNA loop is long enough to allow the structure to adopt a relaxed conformation. The observed distribution of the inner angle (q) of the tweezers (measured from 309 individual structures) is broad and centered at 80° to 90°.

We could contract and extend the ssDNA loop by introducing secondary or tertiary structures that generate enough force to control the angle. Sets of staple strands were designed to either contract the ssDNA loop and fix an acute angle (a narrow distribution centered at 41° T) 7° via the formation of a two-helix bundle (FIG. 2H) or to extend the loop to secure a right (FIG. 2I) or obtuse angle (FIG. 2J) via the formation of a three-helix bundle of specific length. The design with the right angle shows a narrow and symmetrical distribution centered at 94° T 10°, and the design with the obtuse angle has a broader angle distribution centered at 102° and exhibits an asymmetry that is more heavily weighted toward smaller angles.

Figure 3:
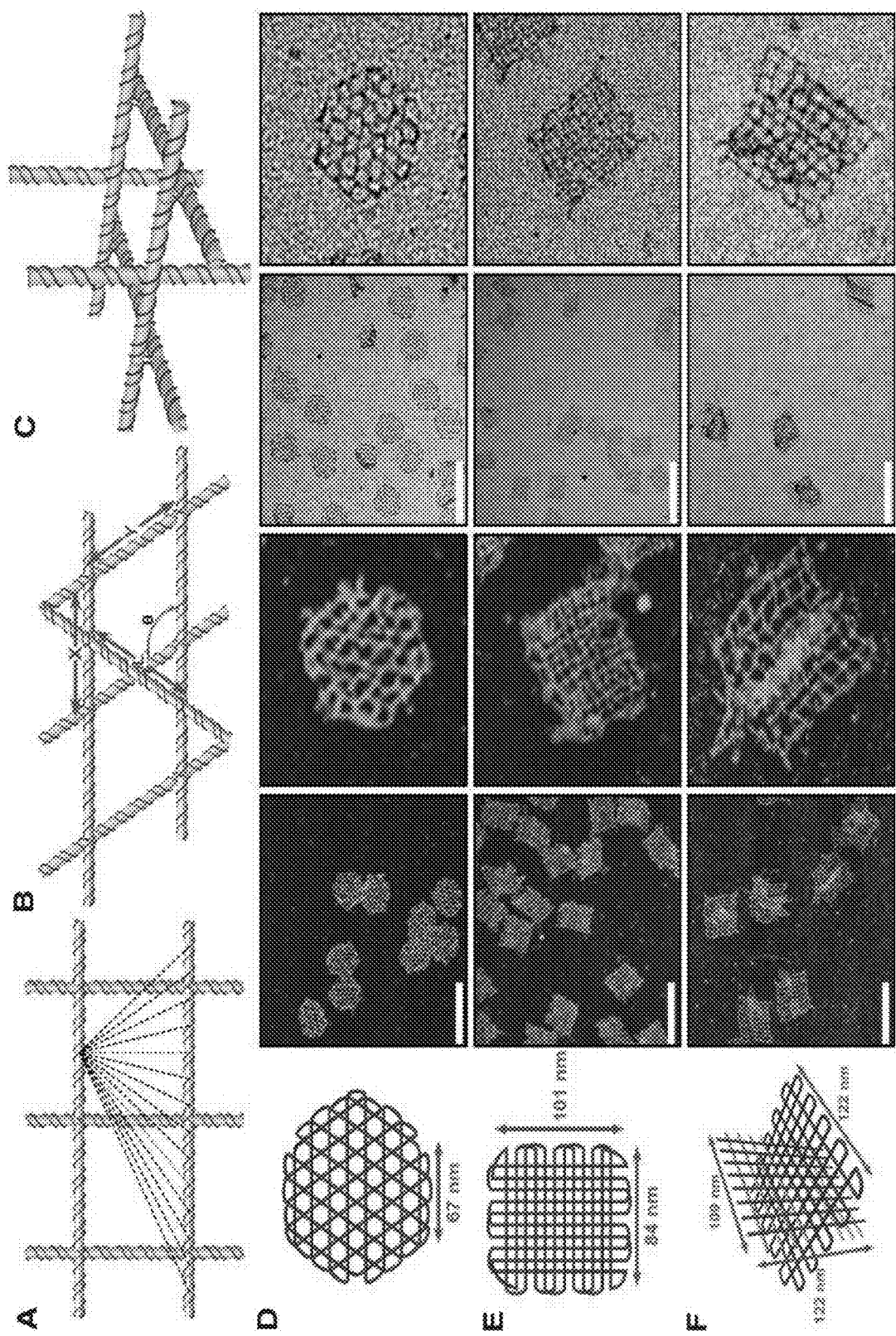
FIG. 3. Multilayer gridiron design strategies. (A and B) Strategy 1 is stacked layers. (A) A portion of a double-layer gridiron lattice with 52-bp cavity size. The yellow circles designate the permissible connection points to a third layer. The dashed lines correspond to possible connection points to form additional layers. (B) Given the double-layer gridiron lattice (X and Y lengths) and the distance between crossover points in the third layer, the angle q can be calculated as $180°-\cos^{-1}[(X2+Y2-L2)/2XY]$. (C) Strategy 2 is intertwining gridiron planes. (D to F) Schematics (left), AFM (middle), and TEM (right) images of (D) a three-layer hexag-onal gridiron design, q=120°; (E) a four-layer gridiron design, q is not controlled because the dashed green line in (A) represents a connection strategy that cannot fix the angle; and (F) a 3D gridiron assembled by using strategy 2. All scale bars indicate 200 nm, and all zoom-in images (images without scale bars) are 200 by 200 nm.
Figure 4:
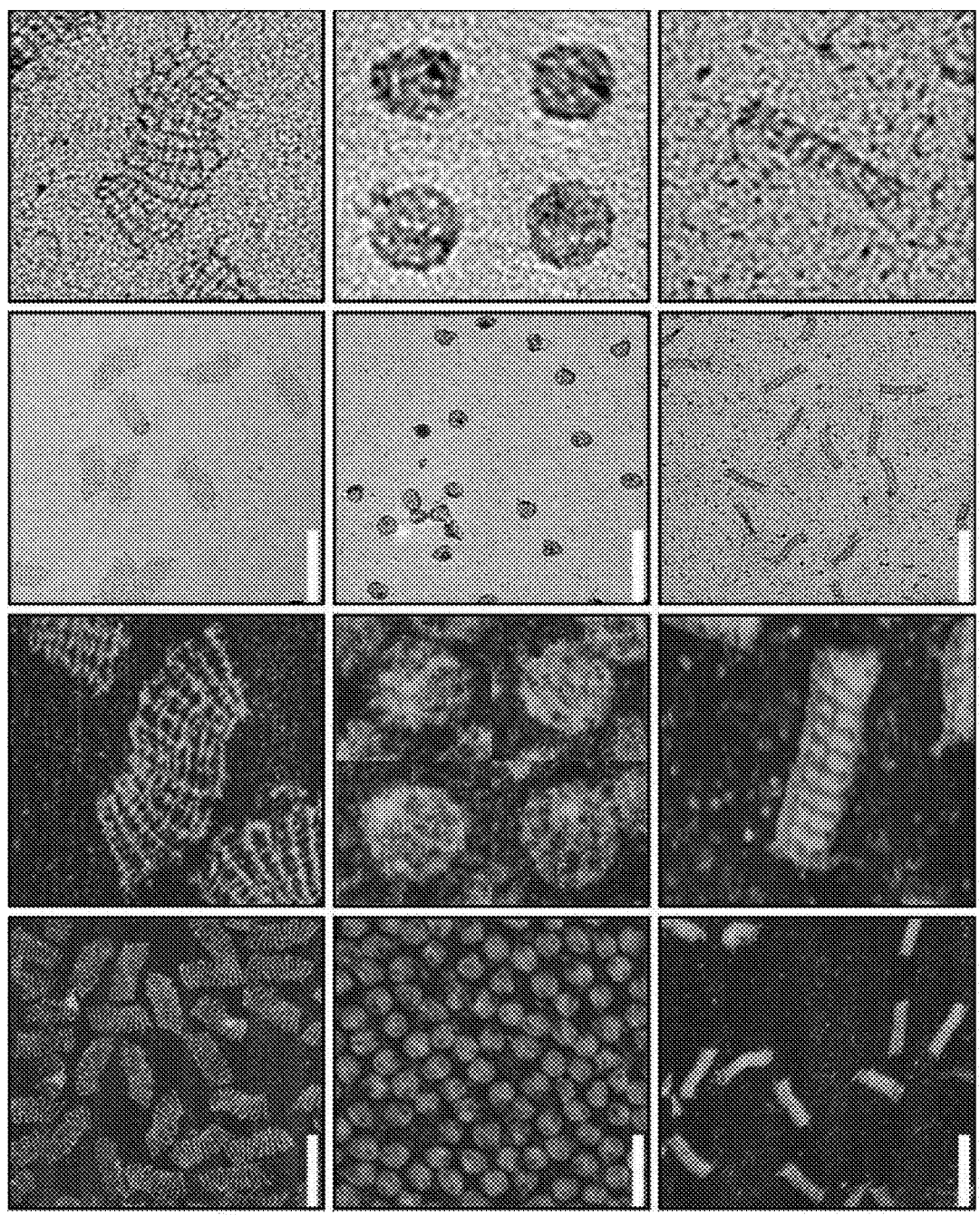
FIG. 4. Schematics (left), AFM (middle), and TEM images (right) of (A) an S-shaped structure, (B) a sphere, and (C) a screw. All scale bars indicate 200 nm, and all zoom-in images (images without scale bars) are 200 by 200 nm. In (B) and (C), the diameter and the width, respectively, appear to be larger in the AFM images compared with the TEM images. This difference is probably a result of flattening of the 3D objects into two-layer structures and AFM tip convolution.

We extended the gridiron design into the third dimension by three different strategies. The first involves stacking multiple layers of 2D gridiron lattices at selected connection points (FIG. 3, A and B). The second relies on intertwining several gridiron planes in x-y-z directions (FIG. 3C). The third method has its basis in distorting a single layer of DNA gridiron into 3D structures by controlling their curvatures (FIG. 4). By using the first strategy, we constructed a three-layer hexagonal (FIG. 3D), a four-layer rectangular gridiron (FIG. 3E), and a three-layer parallelogram structure. For all multilayer gridiron structures, the scaffold strand raster fills each layer, with an off-set in the angle formed between the helices of adjacent layers. The three-layer hexagonal and four-layer rectangular structures maintained 60° and 90° offsets between layers, respectively.

Varying the location and distance between connection points will yield differently patterned multilayer structures. In contrast to the angle flexibility present in the quasi-2D structures, the addition of a third layer fixes the angles at junction points. The only exception to this is for connections through the center of the same unit motif, as shown by the green dashed line (FIG. 3A). In a 3D model of an eight-by-eight-by-eight three-layer hexagonal gridiron structure (FIG. 3D), neighboring junctions in the top and bottom layers are 52 bp apart, and neighboring junctions in the middle layer (alternating connections to the top and bottom layers) are 26 bp apart. Because X=Y=L (FIG. 3B), each junction should adopt a 60° torsion angle. A four-layer rectangular gridiron structure (FIG. 3E) can be broken down into two six-by-five double-layer gridirons (with 52-bp cavities) stacked on top of one another with a 26-bp offset in the connections between the first and third, and second and fourth, layers.

The relations of the lattice planes in gridiron structures are not restricted to stacked multilayer structures. The 3D gridiron structures can also be assembled by integrating gridiron lattices with scaffold-free elements. FIG. 3F presents such a design in which a nine-by-nine gridiron plane (shown in blue) is intertwined with an eight-by-eight scaffold-free gridiron plane (shown in yellow). The complex, interwoven topology of this particular structure required combining scaffolded and scaffold-free components.

Gridiron designs can allow assembly of even more complex structures by inducing a desired curvature in the basic structural unit described in nonparallel helices. The relation between adjacent linear helices (the angles formed by their theoretical intersection) between adjacent linear helices was varied. Some 3D gridiron structures that contain curvature were also achieved, such as the sphere shown in FIG. 4B. The helices in concentric ring and radial spoke layers are stretched in the center and shrunk at the edges, forming a latitudinal and longitudinal framework, respectively. This is realized by progressively adjusting the distance between junctions in latitudinal directions. Additional modifications to the basic structural motif can be used to produce other complex structures. In the screw structure (FIG. 4C), the polarity of the DNA strands in the square unit motif differs from what is illustrated in FIG. 1B (where adjacent scaffold helices have an antiparallel polarity in one direction and the same polarity in the other direction). The scaffold strand is arranged in an antiparallel configuration to form a wireframe cylinder structure (11 helices are arranged axially) and subsequently wraps around the cylinder (analogous to a left-handed screw) until the two ends meet. The distance between adjacent axial helices is 21 bp, the interthread distance is 42 bp, and the AFM and TEM images display the expected left-handed conformation.

The design principles of creating gridiron units allow scaffold strands to travel in multiple directions, which represent an important departure from certain aspects of the previous DNA origami methods. Traditional Holliday junctions do not naturally adopt conformations that would allow them to be connected in such a way, and it was unexpected to find that these motifs could (within a larger network of crossovers) endure a 150° rotation of one of the arms while simultaneously maintaining their integrity. Indeed, the flexible and dynamic behavior of these motifs may have excluded these types of junction conformations for consideration in scaffolded structures. Yield analysis from agarose gel and TEM images shows that the structures, even without purification, form with reasonably high yield (from ~36% for the gridiron tweezers to ~85% for the gridiron screw, estimated from agarose gels; from ~51% for the gridiron sphere to ~89% for the four-layer gridiron, estimated from TEM images; see supplementary materials for yield analysis). The ability to engineer DNA gridirons that are analogous to vector-based objects, where a series of points with defined positions in 3D space are connected by lines, is an important milestone in the development of synthetic nucleic acid structures. In particular, this opens up new opportunities to implement the design of complex wireframe structures that are amenable to dynamic controls. A future challenge in DNA origami is to achieve true folding, starting from a 2D sheet (miura ori), rather than the 1D M13 scaffolds commonly used in traditional DNA origami construction. The loose 2D networks and freely rotating hinges between different planes of DNA gridirons provide the design features necessary to implement Miura ori type of origami.

EXAMPLES

It should be understood that these Examples, while indicating preferred embodiments of the invention, are given by way of illustration only. From the above discussion and these following Examples, one skilled in the art can ascertain the essential characteristics of this invention, and without departing from the spirit and scope thereof, can make various changes and modifications of the invention to adapt it to various uses and conditions.

Materials and Methods

All staple strands were purchased from Integrated DNA Technologies Inc. (www.IDTDNA.com) in the format of 96-well plates at a 25 nmole synthesis scale. All the strands were normalized to 200 UM×100 UL and were used without further purification. M13mp18 single stranded DNA was purchased from New England Biolabs (NEB, Catalog number: #N4040S) and was used as received.

Assembly of 2D and 3D DNA nanostructures. The design and sequences of the DNA oligos used to form a particular structure are listed below. For each design, 10 nM of single stranded M13mp18 DNA (7,249 nucleotides) was mixed with a 10 times molar excess of staple strands in TAE $Mg^{2+}$ buffer (40 mM Tris, 20 mM Acetic acid, 2 mM EDTA and 12.5 mM magnesium acetate, pH 8.0). The resulting solutions were annealed from 95° C. to 4° C. to form the designed structures. The exact temperature steps for the slow anneal are as follows: 94 to 86° C. at 4° C. per 5 minutes; 85 to 70° C. at 1° C. per 5 minutes; 70 to 40° C. at 1° C. per 15 minutes; 40 to 25° C. at 1° C. per 10 minutes. The exact temperature steps for the fast anneal are as follows: 90 to 76° C. at 2° C. per 5 minutes; 76 to 24° C. at 4° C. per 5 minutes. All structures form in both anneal protocols. All samples are then subjected to AFM imaging and TEM imaging without further purification.

AFM imaging. For AFM imaging, the sample (2 L) was deposited onto a freshly cleaved mica surface (Ted Pella, Inc.) and left to adsorb for 2 min. 50 L buffer (1×TAE-$Mg^{2+}$, plus 2 L 100 mM NiCl2) was added onto the mica, and the sample was scanned on a Veeco 8 AFM in the Scanasyst in Fluid mode using scanasyst in fluid+tips (Veeco, Inc.).

TEM imaging: TEM samples were prepared by dropping 2 μL of the sample solution on a carbon-coated grid (400 mesh, Ted Pella). Before depositing the sample, the grids were negatively glow discharged (Emitech K100X). After 1 minute, the excess sample was wicked away from the grid with a piece of filter paper. To remove the excess salt, the grid was washed with a drop of nanopure water and the excess water was wicked away with filter paper. For staining, the grid was treated with a drop of 0.7% uranyl formate solution and the excess solution was removed with filter paper. The grid was treated with a second drop of uranyl formate solution for 20 seconds, and the excess solution was removed with filter paper. The grid was subsequently held at room temperature in air to evaporate the excess solution. TEM studies were conducted with a Philips CM12 transmission electron microscope, operated at 80 kV in bright field mode.

Agarose Gel electrophoresis: The folding products were subject to native gel electrophoresis on 0.75% agarose gel (1×TAE-Mg$^{2+}$, preloaded in the gel with 0.5 µg/mL ethidium bromide) at 75-80 V for two to three hours and the gels were visualized under UV light.

Page Gel electrophoresis: The folding products were subject to native gel electrophoresis on 6% Native PAGE gel (polyacrymide; 1×TAE-Mg$^{2+}$) at 200V for 2 hours at 20 degree and the gels were visualized under UV light.

Design details and sequences of assembled structures. "Tiamat" software was used to design all DNA Gridiron structures. Tiamat is a basic DNA drawing software program (similar programs also exist) and no special algorithms were used to design the DNA Gridiron structures. Most of the design tasks were performed manually and Tiamat was primarily used to generate staple strands sequences according to the scaffold strand sequence.

Figure 5:
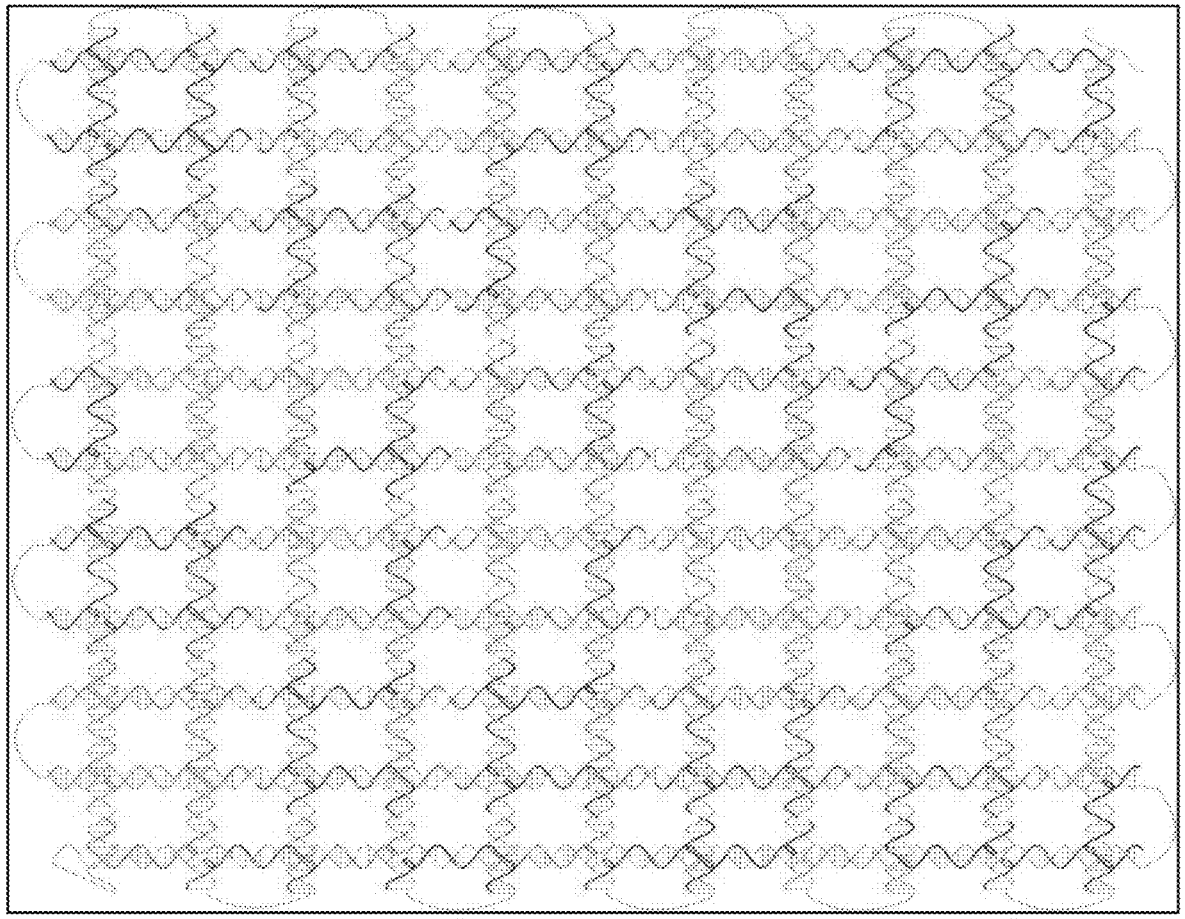
FIG. 5 shows sequences of the staples in the 21 bps Gridiron structure.

FIG. 5 illustrates the design details and staple strand sequences of some example DNA Gridiron structures. Tiamat software and files for all designs are available for downloading at the following website: skydrive.live.com/redir?resid=2416F4B1C095AF65!152&authkey=!AELrUerdPdo1P1w.

TABLE 1

Sequences of the staples in the 21 bps Gridiron structure

| Name (No.) | Sequence | SEQ ID NO |
|---|---|---|
| 21bpsGridiron-1 | GAAAATTCATAAGTAAGCGTCATACATGGCTTAGACGGGAGA | 1 |
| 21bpsGridiron-2 | ATATTCACAAAATAAAAACAGGGAAGCGCATTTTGATGATAC | 2 |
| 21bpsGridiron-3 | AGGAGTGTACTAATAAACAGCCATATTATTTAATTGGCCTTG | 3 |
| 21bpsGridiron-4 | GCCAGTTACAAGGTAATAAGTTTTAACGGGGTGTCCTGAACA | 4 |
| 21bpsGridiron-5 | GCAGAACGCGCGAGGTTGAGGCAGGTCAGACGTCCCAATCCA | 5 |
| 21bpsGridiron-6 | AATAAGAAACGGACTTGAGCCATTTGGGAATTTTCAGCTAAT | 6 |
| 21bpsGridiron-7 | GAGAGAATAACCAAATAAATCCTCATTAAAGCAAAAGGGCGA | 7 |
| 21bpsGridiron-8 | AGCATTGACAGCTGTTTATCAACAATAGATAACAGTGCCTTG | 8 |
| 21bpsGridiron-9 | AGTAACAGTGCCCAGTAATAAGAGAATATAAAAGCCGCCGCC | 9 |
| 21bpsGridiron-10 | GCATTTTCGAGCCGTATAAACAGTTAATGCCCTATCAAAATC | 10 |
| 21bpsGridiron-11 | ATTAAGACGCTCGCCACCAGAACCACCACCAGGTACCGACAA | 11 |
| 21bpsGridiron-12 | AAGGTAAAGTAAGCACCATTACCATTAGCAAGGATAGCTTAG | 12 |
| 21bpsGridiron-13 | TTTACCGTTCCTGGTTTACCAGCGCCAAAGACCAGAATGGAAAG | 13 |
| 21bpsGridiron-14 | CATTCAACCGATTGACGGAAATTATTCATTAAAGCCTTTACA | 14 |
| 21bpsGridiron-15 | GAAAATAGCAGGTGAATTATCACCGTCACCATTTTTTGTT | 15 |
| 21bpsGridiron-16 | GCAAAGACACCGTAAATGAATTTTCTGTATGGTAATTGAGCG | 16 |
| 21bpsGridiron-17 | TAGCATTCCACACCCTGAACAAAGTCAGAGGGGATTTTGCTA | 17 |
| 21bpsGridiron-18 | AACAACTTTCACGCTAACGAGCGTCTTTCCAGACAACGCCTG | 18 |
| 21bpsGridiron-19 | AATCTTACCAAACAGTTTCAGCGGAGTGAGAAATGTAGAAAC | 19 |
| 21bpsGridiron-20 | AGAAAATAATGTTTCGTCACCAGTACAAACTAGCCTAATTT | 20 |
| 21bpsGridiron-21 | ATTAACTGAACAGACAGCCCTCATAGTTAGCGACAATCAATA | 21 |
| 21bpsGridiron-22 | AACAACATGAGAGCCAGCAAAATCACCAGTATTCTGTCCA | 22 |
| 21bpsGridiron-23 | CGTAACACTGAATCCCATCCTAATTTACGAGCTAGAAAGGAA | 23 |
| 21bpsGridiron-24 | CAACTAAAGGATTAACAACGCCAACATGTAATACCCATGTAC | 24 |
| 21bpsGridiron-25 | AATCGCCATATATTGCGAATAATAATTTTTTCGCTTAGGTTG | 25 |
| 21bpsGridiron-26 | ATAGGTCTGAGGGGATAGCAAGCCCAATAGGATTAGGCAGAG | 26 |
| 21bpsGridiron-27 | TCCAGACGTTAACGGAATAAGTTTATTTTGTCTAACGATCTAAA | 27 |
| 21bpsGridiron-28 | TCGCCCACGCAGCCATTGCAACAGGAAAAATGCGCCGACA | 28 |
| 21bpsGridiron-29 | CCTCATTTTCAAGACTACCTTTTTAACCTCCGACGTTGAAAA | 29 |
| 21bpsGridiron-30 | TCTCCAAAAAATGAATTACCTTTTTTAATGGAGAGCCACCAC | 30 |

TABLE 1-continued

Sequences of the staples in the 21 bps Gridiron structure

| Name (No.) | Sequence | SEQ ID NO |
|---|---|---|
| 21bpsGridiron-31 | ATATAAGTATTTGACGCTCAATCGTCTGAAGATAAGTGCC | 31 |
| 21bpsGridiron-32 | ACCCTCAGAGCGAGAAGAGTCAATAGTGAATTCCTGCCTATT | 32 |
| 21bpsGridiron-33 | TCGGAACCTATTGTGAGTGAATAACCTTGCTTCAGAGCCACC | 33 |
| 21bpsGridiron-34 | CGTTTGCCAATTCACCAGTCACACGACCAGTTCGGTCATA | 34 |
| 21bpsGridiron-35 | AAACATAGCGCCGGAAACGTCACCAATGAATAATTTTCCC | 35 |
| 21bpsGridiron-36 | ACAATTTCATTAAGGCTCCAAAAGGAGCCTTTTATACTTCTG | 36 |
| 21bpsGridiron-37 | GAACAAAGAATCAGTAGCGACAGAATCAAGTTGAGTAACA | 37 |
| 21bpsGridiron-38 | GATAATACATTTGCTTTCGAGGTGAATTTCTTAGCCCTAAAA | 38 |
| 21bpsGridiron-39 | ACAGAGATATAGCGCGTTTTCATCGGCATTTAATAAAAGG | 39 |
| 21bpsGridiron-40 | ATTTTAAAAGTTTTGCCTTTAGCGTCAGACTGGAACCCTTCT | 40 |
| 21bpsGridiron-41 | GACCTGAAAGCCGGAACCAGAGCCACCACCGGAACGTTATTA | 41 |
| 21bpsGridiron-42 | ATCAAAATCACGTAAGAATACGTGGCACAGACGGTTTTGCTC | 42 |
| 21bpsGridiron-43 | AGTACCAGGCGATGGATTATTTACATTGGCAGTCTTTTCATA | 43 |
| 21bpsGridiron-44 | AATTCGACAACGAGAAGGATTAGGATTAGCGGAATATTTTTG | 44 |
| 21bpsGridiron-45 | AATGGCTATTACCGTACTCAGGAGGTTTAGTACTTTACAAAC | 45 |
| 21bpsGridiron-46 | TAGGTGTATCAGTCTTTAATGCGCGAACTGATAAACAGCTTG | 46 |
| 21bpsGridiron-47 | ATACCGATAGTCGCTCATGGAAATACCTACATTAGCCCGGAA | 47 |
| 21bpsGridiron-48 | GTTTATCAGCTTGAGGATTTAGAAGTATTAGACCGCCACCCT | 48 |
| 21bpsGridiron-49 | CAGAACCGCCATATAATCCTGATTGTTTGGATAATTGTATCG | 49 |
| 21bpsGridiron-50 | AGACTCCTCAATCGTATTAAATCCTTTGCCCGAACCGCCTCC | 50 |
| 21bpsGridiron-51 | CTCAGAGCCGCTATCATCATATTCCTGATTATTAAGAGGCTG | 51 |
| 21bpsGridiron-52 | TCGCTATTAATACCATCGATAGCAGCACCGTAAACCACCAGA | 52 |
| 21bpsGridiron-53 | AGGAGCGGAATCACCCTCAGAACCGCCACCCTCTGTAAATCG | 53 |
| 21bpsGridiron-54 | AAATCAATATATATTCTGAAACATGAAAGTATCAGATGATGG | 54 |
| 21bpsGridiron-55 | CAATTCATCAACCCTCAGAACCGCCACCCTCAAACAGTACAT | 55 |
| 21bpsGridiron-56 | GGTTATATAACCGGCTACAGAGGCTTTGAGGACTTAATTGAG | 56 |
| 21bpsGridiron-57 | TAAGGCGTTCCCAATTCTGCGAACGAGTAGTGAAATACCG | 57 |
| 21bpsGridiron-58 | GCTTAATTGCTAACGCAATAATAACGGAATACAGGTCATTTTTG | 58 |
| 21bpsGridiron-59 | TAATTTCATCTACTTCAAATATCGCGTTTTAATCATAATTAC | 59 |
| 21bpsGridiron-60 | TAGAAAAGCCGTTTACCAGACGACGATAAAAATATTTTAGT | 60 |
| 21bpsGridiron-61 | AGTTGAGATTTAGACTCCTTATTACGCAGTATATTATTACAGGT | 61 |
| 21bpsGridiron-62 | AAGACAAAGAATAATCATTGTGAATTACCTTATACAAATTCT | 62 |
| 21bpsGridiron-63 | TACCAGTATAATCCATGTTACTTAGCCGGAACATCCAATCGC | 63 |
| 21bpsGridiron-64 | ATCTTTGACCCATACATAAAGGTGGCAACATAGGCAAAGAATA | 64 |
| 21bpsGridiron-65 | AACCGAGGAGAATATAATGCTGTAGCTCAAGCCGAACAAA | 65 |
| 21bpsGridiron-66 | CTAATATCAGAGCACCAACCTAAAACGAAAGATAAAAGAAAC | 66 |
| 21bpsGridiron-67 | CCACTACGAAGGAGATAACCCACAAGAATTGAAAACAAAGTA | 67 |

TABLE 1-continued

Sequences of the staples in the 21 bps Gridiron structure

| Name (No.) | Sequence | SEQ ID NO |
|---|---|---|
| 21bpsGridiron-68 | CAACGGAGATTCTATTTTGCACCCAGCTACAAATACGTAATG | 68 |
| 21bpsGridiron-69 | TAGAAGGCTAAGTACGGTGTCTGGAAGTTTCCCAATAGCA | 69 |
| 21bpsGridiron-70 | CAATCAATAATAGTTTCCATTAAACGGGTAAATTTTATCCTG | 70 |
| 21bpsGridiron-71 | TTTCATGAGGACGGCTGTCTTTCCTTATCATTGTGTCGAAAT | 71 |
| 21bpsGridiron-72 | CCGCGACCTGCAGCCAACGCTCAACAGTAGGGCTAAAGACTT | 72 |
| 21bpsGridiron-73 | AAGATTAGTTGTGTATCATCGCCTGATAAATTCCAAGAACGG | 73 |
| 21bpsGridiron-74 | GTATTAAACCAATTATACCAGTCAGGACGTTGGCCTTAAATC | 74 |
| 21bpsGridiron-75 | AGAACTGGCTCAGTACCGCACTCATCGAGAACAGCAACACTA | 75 |
| 21bpsGridiron-76 | TCATAACCCTCTGTTTAGTATCATATGCGTTATGCGATTTTA | 76 |
| 21bpsGridiron-77 | AGCGAACCTCCGGAATTACGAGGCATAGTAAGAAGCAAGCCG | 77 |
| 21bpsGridiron-78 | TTTTTATTTTCGACCGGAAGCAAACTCCAACAGAGGCGTTTT | 78 |
| 21bpsGridiron-79 | AAAGCGAACCAATCGTAGGAATCATTACCGCGCATTCCATAT | 79 |
| 21bpsGridiron-80 | AACAGTTGATTAAATAAGAATAAACACCGGAATTCGAGCTTC | 80 |
| 21bpsGridiron-81 | ATATGCAACTATATCCGGTATTCTAAGAACGCGGTCAGGATT | 81 |
| 21bpsGridiron-82 | AGAGAGTACCTTTTAAGAAAAGTAAGCAGATACATGTTTTAA | 82 |
| 21bpsGridiron-83 | TAACGCCAAAACGACTTGCGGGAGGTTTTGAAGGAAGAAAAA | 83 |
| 21bpsGridiron-84 | TCTACGTTAATAAGAAACAATGAAATAGCAATTGCAGATACA | 84 |
| 21bpsGridiron-85 | GTAGAAAATACCCAGCGATTATACCAAGCGCGGTTAAGCCCA | 85 |
| 21bpsGridiron-86 | ATAATAAGAGCAAAACGAACTAACGGAACAACGTTAGCAAAC | 86 |
| 21bpsGridiron-87 | TGGCATGATTAAGGAATACCACATTCAACTAAAGCTATCTTA | 87 |
| 21bpsGridiron-88 | CCGAAGCCCTTTTAATTGCTCCTTTTGATAAGCCAAAAGAAC | 88 |
| 21bpsGridiron-89 | AAGCCCGAAAGTCTGACCTAAATTTAATGGTTATTTAGTTTG | 89 |
| 21bpsGridiron-90 | ACCATTAGATAGATTGCTTTGAATACCAAGTTGATTAAGAGG | 90 |
| 21bpsGridiron-91 | TAAACAGTTTTTGATTAGTAATAACATCACCATTGAATCC | 91 |
| 21bpsGridiron-92 | AATTTCAACTTCGCGAGAAAACTTTTTCAAATACCAAAATAG | 92 |
| 21bpsGridiron-93 | CGAGAGGCTTTTTATTCATTTCAATTACCTGAGAGATGGTTT | 93 |
| 21bpsGridiron-94 | ATTCATTACAACTATCGGCCTTGCTGGTAAAGTAATCTTG | 94 |
| 21bpsGridiron-95 | GAGGGTAGCAATATATGTAAATGCTGATGCAAGAGGCGCAGA | 95 |
| 21bpsGridiron-96 | CGGTCAATCATAACATCAAGAAAACAAAATTAGCATCGGAAC | 96 |
| 21bpsGridiron-97 | GATTCGCCTCATTTCGCAAATGGTCAATAATTACATCGGG | 97 |
| 21bpsGridiron-98 | AATAATGGAAGCACCCTCAGCAGCGAAAGACAATTACATTTA | 98 |
| 21bpsGridiron-99 | TGCGGGATCGTGGTTAGAACCTACCATATCAATTTGAAAGAG | 99 |
| 21bpsGridiron-100 | GACAGATGAACACTAACAACTAATAGATTAGAAGGCCGCTTT | 100 |
| 21bpsGridiron-101 | CTCAAATATTTGGGGCGCGAGCTGAAAAGGTCTAAAGCAT | 101 |
| 21bpsGridiron-102 | CATCGCCATTACTGAGGCTTGCAGGGAGTTAAGCCGTCAATA | 102 |
| 21bpsGridiron-103 | ATATTCGGTCGAAAATACCGAACGAACCACCAGGCTGGCTGA | 103 |
| 21bpsGridiron-104 | CCTTCATCAAGTATCCAGAACAATATTACCGCCATAACCGAT | 104 |
| 21bpsGridiron-105 | TCTTTAGGAGCGGTGTACAGACCAGGCGCATAGCAGAAGATA | 105 |

TABLE 1-continued

Sequences of the staples in the 21 bps Gridiron structure

| Name (No.) | Sequence | SEQ ID NO |
|---|---|---|
| 21bpsGridiron-106 | AAACAGAGGTGGCTCATTCAGTGAATAAGGCTATCTAAAATA | 106 |
| 21bpsGridiron-107 | GTAACAAAGCTAGGCGGTCAGTATTAACACCGTGCGGAATCG | 107 |
| 21bpsGridiron-108 | TCATAAATATTTTGCCTGAGTAGAAGAACTCACCAAATCAAC | 108 |
| 21bpsGridiron-109 | AAATCAACAGTAGACTGGATAGCGTCCAATACCCTGCAACAG | 109 |
| 21bpsGridiron-110 | TGCCACGCTGAAATCAAAAATCAGGTCTTTACGTCAGTTGGC | 110 |
| 21bpsGridiron-111 | GAATGACCATAGAGCCAGCAGCAAATGAAAAATGGCATCAAT | 111 |
| 21bpsGridiron-112 | TCTACTAATAGTAACCGTTGTAGCAATACTTCCAGAAAACGA | 112 |
| 21bpsGridiron-113 | TATATTTTCATCAAACCCTCAATCAATATCTGCCTGACTATT | 113 |
| 21bpsGridiron-114 | ATAGTCAGAAGAATATACAGTAACAGTACCTTCCTGTTTAGC | 114 |
| 21bpsGridiron-115 | GTAAAATGTTTTGAAAGGAATTGAGGAAGGTTTGCCCTGACG | 115 |
| 21bpsGridiron-116 | AGAAACACCAGAAATAAAGAAATTGCGTAGATGGGGGTAATA | 116 |
| 21bpsGridiron-117 | ATGATGAAACAAAGGGAACCGAACTGACCAACAATTATTTGC | 117 |
| 21bpsGridiron-118 | ACGTAAAACAGAACGAGTAGTAAATTGGGCTTGCAAAAGAAG | 118 |
| 21bpsGridiron-119 | GCAGAGGCGAATGCAAAAGAAGTTTTGCCAGATTTCAGGTTT | 119 |
| 21bpsGridiron-120 | AACGTCAGATGCAAAGCGGATTGCATCAAAAAACAAATCGC | 120 |

TABLE 2

Sequences of the staples in the 42 bps Gridiron structure

| Name (No.) | Sequence | SEQ ID NO |
|---|---|---|
| 42bpsGridiron-1 | CCTCCCGACTTGCGGGAGGTTCTGCATTAATGAATCGGCCAA | 121 |
| 42bpsGridiron-2 | TAACTCACATTAATTGCGTTGAGAATTAACTGAACACCCTGA | 122 |
| 42bpsGridiron-3 | AAAATGAAAATAGCAGCCTTTTTAAATTTTTGTTAAATCAGC | 123 |
| 42bpsGridiron-4 | AACAGGAAGATTGTATAAGCATACAATTTTATCCTGAATCTT | 124 |
| 42bpsGridiron-5 | AGTTGCTATTTTGCACCCAGCAATATTTAAATTGTAAACGTT | 125 |
| 42bpsGridiron-6 | AATATTTTGTTAAAATTCGCAACAGAGAGAATAACATAAAAA | 126 |
| 42bpsGridiron-7 | CAGGGAAGCGCATTAGACGGGCGCTCACTGCCCGCTTTCCAG | 127 |
| 42bpsGridiron-8 | TCGGGAAACCTGTCGTGCCAGTTGAAGCCTTAAATCAAGATT | 128 |
| 42bpsGridiron-9 | ACCAACGCTAACGAGCGTCTTTGTCAATCATATGTACCCCGG | 129 |
| 42bpsGridiron-10 | GGTCATTGCCTGAGAGTCTGGACGATTTTTGTTTAACGTCA | 130 |
| 42bpsGridiron-11 | TTATCCCAATCCAAATAAGAAAGCAAACAAGAGAATCGATGA | 131 |
| 42bpsGridiron-12 | ACGGTAATCGTAAAACTAGCATCCAGAGCCTAATTTGCCAGT | 132 |
| 42bpsGridiron-13 | CCGCCACCCTCAGAGCCACCATTTCATCAACATTAAATGTGA | 133 |
| 42bpsGridiron-14 | TCATTTTTTAACCAATAGGAAGTAGCGCGTTTTCATCGGCAT | 134 |
| 42bpsGridiron-15 | AACCATCGATAGCAGCACCGTTGGGGTGCCTAATGAGTGAGC | 135 |
| 42bpsGridiron-16 | AGCTTGCATGCCTGCAGGTCGTAGTTGCGCCGACAATGACAA | 136 |
| 42bpsGridiron-17 | TTTCGGTCATAGCCCCCTTATAGAGATCTACAAAGGCTATCA | 137 |

TABLE 2-continued

Sequences of the staples in the 42 bps Gridiron structure

| Name (No.) | Sequence | SEQ ID NO |
| --- | --- | --- |
| 42bpsGridiron-18 | CCTCATATATTTTAAATGCAAAAAAAAGGCTCCAAAAGGAGC | 138 |
| 42bpsGridiron-19 | TTTCACGTTGAAAATCTCCAATGCCTGAGTAATGTGTAGGTA | 139 |
| 42bpsGridiron-20 | AAGATTCAAAAGGGTGAGAAATGAGAATAGAAAGGAACAACT | 140 |
| 42bpsGridiron-21 | TCATAGTTAGCGTAACGATCTTGGTCATAGCTGTTTCCTGTG | 141 |
| 42bpsGridiron-22 | CCGAGCTCGAATTCGTAATCAAAAGTTTTGTCGTCTTTCCAG | 142 |
| 42bpsGridiron-23 | ACGTTAGTAAATGAATTTTCTTCTCCGTGGGAACAAACGGCG | 142 |
| 42bpsGridiron-24 | GCGAGTAACAACCCGTCGGATGTATGGGATTTTGCTAAACAA | 144 |
| 42bpsGridiron-25 | CTTTAATTGTATCGGTTTATCTCACGTTGGTGTAGATGGGCG | 145 |
| 42bpsGridiron-26 | GATTGACCGTAATGGGATAGGAGCTTGCTTTCGAGGTGAATT | 146 |
| 42bpsGridiron-27 | CTTTCAACAGTTTCAGCGGAGGGCCGGAGACAGTCAAATCAC | 147 |
| 42bpsGridiron-28 | CATCAATATGATATTCAACCGTCAGAGCCGCCACCCTCAGAA | 148 |
| 42bpsGridiron-29 | CCACCACCGGAACCGCCTCCCTTCTAGCTGATAAATTAATGC | 149 |
| 42bpsGridiron-30 | TGAAATTGTTATCCGCTCACAGCATTGACAGGAGGTTGAGGC | 150 |
| 42bpsGridiron-31 | CCACCACCAGAGCCGCCGCCAATTCCACACAACATACGAGCC | 151 |
| 42bpsGridiron-32 | TCTGGCCTTCCTGTAGCCAGCCCCTCAGAGCCGCCACCAGAA | 152 |
| 42bpsGridiron-33 | CGGAGAGGGTAGCTATTTTTGTAGCGTTTGCCATCTTTTCAT | 153 |
| 42bpsGridiron-34 | TCTTAAACAGCTTGATACCGAACTCTAGAGGATCCCCGGGTA | 154 |
| 42bpsGridiron-35 | GGAAGCATAAAGTGTAAAGCCAATCAGTAGCGACAGAATCAA | 155 |
| 42bpsGridiron-36 | GTTTGCCTTTAGCGTCAGACTCGCCATCAAAAATAATTCGCG | 156 |
| 42bpsGridiron-37 | ACAGGTAGAAAGATTCATCAGACTCCAGCCAGCTTTCCGGCA | 157 |
| 42bpsGridiron-38 | CATCGTAACCGTGCATCTGCCTGGTTTAATTTCAACTTTAAT | 158 |
| 42bpsGridiron-39 | ATTCAGTGAATAAGGCTTGCCGTAAAACGACGGCCAGTGCCA | 159 |
| 42bpsGridiron-40 | CATTGTGAATTACCTTATGCGAAGGATAAAAATTTTTAGAAC | 160 |
| 42bpsGridiron-41 | TAGCAAAATTAAGCAATAAAGTCTACTAATAGTAGTAGCATT | 161 |
| 42bpsGridiron-42 | CGAACGAGTAGATTTAGTTTGCGCTATTACGCCAGCTGGCGA | 162 |
| 42bpsGridiron-43 | GGCGATCGGTGCGGGCCTCTTACCATTAGATACATTTCGCAA | 163 |
| 42bpsGridiron-44 | ATGGTCAATAACCTGTTTAGCAGGCAAAGCGCCATTCGCCAT | 164 |
| 42bpsGridiron-45 | CCGCTTCTGGTGCCGGAAACCTATATTTTCATTTGGGGCGCG | 165 |
| 42bpsGridiron-46 | AGCTGAAAAGGTGGCATCAATCCTCAGAGCATAAAGCTAAAT | 166 |
| 42bpsGridiron-47 | CGGTTGTACCAAAAACATTATAACTAACGGAACAACATTATT | 167 |
| 42bpsGridiron-48 | AAAATCTACGTTAATAAAACGGACCCTGTAATACTTTTGCGG | 168 |
| 42bpsGridiron-49 | AAGGGGATGTGCTGCAAGGCACGCCAAAAGGAATTACGAGG | 169 |
| 42bpsGridiron-50 | TTCAACTAATGCAGATACATAGATTAAGTTGGGTAACGCCAG | 170 |
| 42bpsGridiron-51 | TATCGGCCTCAGGAAGATCGCTTGAGATTTAGGAATACCACA | 171 |
| 42bpsGridiron-52 | GAGAAGCCTTTATTTCAACGCATTTTAAGAACTGGCTCATTA | 172 |
| 42bpsGridiron-53 | GGTTTTCCCAGTCACGACGTTCTGACGAGAAACACCAGAACG | 173 |
| 42bpsGridiron-54 | AGTAGTAAATTGGGCTTGAGAAGTTTGAGGGGACGACGACAG | 174 |
| 42bpsGridiron-55 | TCTTTCCTTATCATTCCAAGACGTAAAACAGAAATAAAGAAA | 175 |

TABLE 2-continued

Sequences of the staples in the 42 bps Gridiron structure

| Name (No.) | Sequence | SEQ ID NO |
|---|---|---|
| 42bpsGridiron-56 | TTGTTTGGATTATACTTCTGAAAAGTTACCAGAAGGAAACCG | 176 |
| 42bpsGridiron-57 | AATGAAATAGCAATAGCTATCAATGGATTATTTACATTGGCA | 177 |
| 42bpsGridiron-58 | CCAGCCATTGCAACAGGAAAAGCCGTTTTTATTTTCATCGTA | 178 |
| 42bpsGridiron-59 | GCACTCATCGAGAACAAGCAAACGCTCATGGAAATACCTACA | 179 |
| 42bpsGridiron-60 | TTTTGACGCTCAATCGTCTGATTACCGAAGCCCTTTTTAAGA | 180 |
| 42bpsGridiron-61 | AAAGTAAGCAGATAGCCGAACATAATGGAAGGGTTAGAACCT | 181 |
| 42bpsGridiron-62 | ACCATATCAAAATTATTTGCAACGGGTATTAAACCAAGTACC | 182 |
| 42bpsGridiron-63 | GGAATCATTACCGCGCCCAATTCAAACTATCGGCCTTGCTGG | 183 |
| 42bpsGridiron-64 | AATTAACCGTTGTAGCAATACCCAATAATAAGAGCAAGAAAC | 184 |
| 42bpsGridiron-65 | ACAAAGTCAGAGGGTAATTGACCGCCTGGCCCTGAGAGAGTT | 185 |
| 42bpsGridiron-66 | TATTGGGCGCCAGGGTGGTTTAACGCGAGGCGTTTTAGCGAA | 186 |
| 42bpsGridiron-67 | AGGCTTATCCGGTATTCTAAGTTCTTTTCACCAGTGAGACGG | 187 |
| 42bpsGridiron-68 | GCAACAGCTGATTGCCCTTCAGCGCTAATATCAGAGAGATAA | 188 |
| 42bpsGridiron-69 | CCCACAAGAATTGAGTTAAGCTTCTTTGATTAGTAATAACAT | 189 |
| 42bpsGridiron-70 | CACTTGCCTGAGTAGAAGAACAGCAAGCAAATCAGATATAGA | 190 |
| 42bpsGridiron-71 | TTCCAGTAAGCGTCATACATGTGACCTGAAAGCGTAAGAATA | 191 |
| 42bpsGridiron-72 | GATTCACCAGTCACACGACCAAAGGTGAATTATCACCGTCAC | 192 |
| 42bpsGridiron-73 | CAAAAGGGCGACATTCAACCGAATTCATCAATATAATCCTGA | 193 |
| 42bpsGridiron-74 | TTTACAAACAATTCGACAACTACTTTTTCATGAGGAAGTTTC | 194 |
| 42bpsGridiron-75 | CAACCATCGCCCACGCATAACAAAGAACGTGGACTCCAACGT | 195 |
| 42bpsGridiron-76 | GCAGCAAGCGGTCCACGCTGGGGCCGGAAACGTCACCAATGA | 196 |
| 42bpsGridiron-77 | CGACTTGAGCCATTTGGGAATAAAGAGTCTGTCCATCACGCA | 197 |
| 42bpsGridiron-78 | TGGTTGCTTTGACGAGCACGTCTTTTGCGGGATCGTCACCCT | 198 |
| 42bpsGridiron-79 | CTTGCAGGGAGTTAAAGGCCGATAACGTGCTTTCCTCGTTAG | 199 |
| 42bpsGridiron-80 | AATCAGAGCGGGAGCTAAACACCGTAACACTGAGTTTCGTCA | 200 |
| 42bpsGridiron-81 | GGAGGTTTAGTACCGCCACCCTGAGTAACATTATCATTTTGC | 201 |
| 42bpsGridiron-82 | ACGTTATTAATTTTAAAAGTTTCAGAACCGCCACCCTCAGAA | 202 |
| 42bpsGridiron-83 | CCGCCACCCTCAGAGCCACCAGAATGGCTATTAGTCTTTAAT | 203 |
| 42bpsGridiron-84 | CGTGGCACAGACAATATTTTTCCCTCATTTTCAGGGATAGCA | 204 |
| 42bpsGridiron-85 | CAGCAGCGAAAGACAGCATCGACATCGCCATTAAAAATACCG | 205 |
| 42bpsGridiron-86 | GCGCGAACTGATAGCCCTAAAGAACGAGGGTAGCAACGGCTA | 206 |
| 42bpsGridiron-87 | AGCCCAATAGGAACCCATGTAGGAGGCCGATTAAAGGGATTT | 207 |
| 42bpsGridiron-88 | ATCAAAAGAATAGCCCGAGATGTAGCATTCCACAGACAGCCC | 208 |
| 42bpsGridiron-89 | CCAGTACAAACTACAACGCCTAGGGTTGAGTGTTGTTCCAGT | 209 |
| 42bpsGridiron-90 | TAGACAGGAACGGTACGCCAGGCGCAGTCTCTGAATTTACCG | 210 |
| 42bpsGridiron-91 | AGGTCAGACGATTGGCCTTGAAATCGGCAAAATCCCTTATAA | 211 |
| 42bpsGridiron-92 | CCTGTTTGATGGTGGTTCCGATATTCACAAACAAATAAATCC | 212 |

TABLE 2-continued

Sequences of the staples in the 42 bps Gridiron structure

| Name (No.) | Sequence | SEQ ID NO |
|---|---|---|
| 42bpsGridiron-93 | TCATTAAAGCCAGAATGGAAAAATCCTGAGAAGTGTTTTTAT | 213 |
| 42bpsGridiron-94 | GGAACAAAGAAACCACCAGAAGGGTCAGTGCCTTGAGTAACA | 214 |
| 42bpsGridiron-95 | TACTGGTAATAAGTTTTAACGGGAGCGGAATTATCATCATAT | 215 |
| 42bpsGridiron-96 | CCAACAGAGATAGAACCCTTCGCTTTTGATGATACAGGAGTG | 216 |
| 42bpsGridiron-97 | AATCAGTGAGGCCACCGAGTATAGAGCCAGCAAAATCACCAG | 217 |
| 42bpsGridiron-98 | TAGCACCATTACCATTAGCAATTTGCCCCAGCAGGCGAAAAT | 218 |
| 42bpsGridiron-99 | TTGGAACAAGAGTCCACTATTCGATATATTCGGTCGCTGAGG | 219 |
| 42bpsGridiron-100 | CAGAGGCTTTGAGGACTAAAGCGTATTAAATCCTTTGCCCGA | 220 |
| 42bpsGridiron-101 | TCCTGATTATCAGATGATGGCATTGAGGGAGGGAAGGTAAAT | 221 |
| 42bpsGridiron-102 | ATTGACGGAAATTATTCATTAGTAATAAAAGGGACATTCTGG | 222 |
| 42bpsGridiron-103 | TTTGCCAGAGGGGGTAATAGTGTGCCACGCTGAGAGCCAGCA | 223 |
| 42bpsGridiron-104 | AACGAACCACCAGCAGAAGATATGAACGGTGTACAGACCAGG | 224 |
| 42bpsGridiron-105 | CGGAACGAGGCGCAGACGGTCGAGGATTTAGAAGTATTAGAC | 225 |
| 42bpsGridiron-106 | CAAAGGGCGAAAAACCGTCTAATCAACGTAACAAAGCTGCTC | 226 |
| 42bpsGridiron-107 | CGCATAGGCTGGCTGACCTTCGCCGCTACAGGGCGCGTACTA | 227 |
| 42bpsGridiron-108 | CGTGGCGAGAAAGGAAGGGAAATATGCAACTAAAGTACGGTG | 228 |
| 42bpsGridiron-109 | AGGATTAGAGAGTACCTTTAAGAAAGGAATTGAGGAAGGTTA | 229 |
| 42bpsGridiron-110 | TCAGTTGGCAAATCAACAGTTTTGCTCCTTTTGATAAGAGGT | 230 |
| 42bpsGridiron-111 | CATTTTTGCGGATGGCTTAGATCACCTTGCTGAACCTCAAAT | 231 |
| 42bpsGridiron-112 | GCAAATGAAAAATCTAAAGCAGCTTAATTGCTGAATATAATG | 232 |
| 42bpsGridiron-113 | CTGTAGCTCAACATGTTTTAAGAAAGCGAAAGGAGCGGGCGC | 233 |
| 42bpsGridiron-114 | TAAAGCACTAAATCGGAACCCAACAGTTGATTCCCAATTCTG | 234 |
| 42bpsGridiron-115 | TCTGGAAGTTTCATTCCATATTAAAGGGAGCCCCCGATTTAG | 235 |
| 42bpsGridiron-116 | TAGGGCGCTGGCAAGTGTAGCAGAGGCTTTTGCAAAAGAAGT | 236 |
| 42bpsGridiron-117 | CATAGTAAGAGCAACACTATCTTTTTTGGGGTCGAGGTGCCG | 237 |
| 42bpsGridiron-118 | TGAACCATCACCCAAATCAAGATAACCCTCGTTTACCAGACG | 238 |
| 42bpsGridiron-119 | ACGATAAAAACCAAAATAGCGGGTCACGCTGCGCGTAACCAC | 239 |
| 42bpsGridiron-120 | TCTAAAATATCTTTAGGAGCAATAAATATTCATTGAATCCCC | 240 |
| 42bpsGridiron-121 | GTCCAATACTGCGGAATCGTCCTAACAACTAATAGATTAGAG | 241 |
| 42bpsGridiron-122 | GTATTAACACCGCCTGCAACAAAAATGTTTAGACTGGATAGC | 242 |
| 42bpsGridiron-123 | CACACCCGCCGCGCTTAATGCATCAAGAGTAATCTTGACAAG | 243 |
| 42bpsGridiron-124 | AACCGGATATTCATTACCCAATCAGGGCGATGGCCCACTACG | 244 |
| 42bpsGridiron-125 | CCGTCAATAGATAATACATTTAATCATAAGGGAACCGAACTG | 245 |
| 42bpsGridiron-126 | ACCAACTTTGAAAGAGGACAGAAAACAGAGGTGAGGGGGTCA | 246 |
| 42bpsGridiron-127 | ATCAACAATAGATAAGTCCTGTGTCCAGACGACGACAATAAA | 247 |
| 42bpsGridiron-128 | GCAGAGGCATTTTCGAGCCAGGTATGTTAGCAAACGTAGAAA | 248 |
| 42bpsGridiron-129 | AGGAAACGCAATAATAACGGATTGCTTTGAATACCAAGTTAC | 249 |
| 42bpsGridiron-130 | GTCAGATGAATATACAGTAACAAACCAATCAATAATCGGCTG | 250 |

TABLE 2-continued

Sequences of the staples in the 42 bps Gridiron structure

| Name (No.) | Sequence | SEQ ID NO |
|---|---|---|
| 42bpsGridiron-131 | TCCTAATTTACGAGCATGTAGAGTACCTTTTACATCGGGAGA | 251 |
| 42bpsGridiron-132 | AACAATAACGGATTCGCCTGAATACCCAAAAGAACTGGCATG | 252 |
| 42bpsGridiron-133 | ATTAAGACTCCTTATTACGCATAATAAGAGAATATAAAGTAC | 253 |
| 42bpsGridiron-134 | CGACAAAAGGTAAAGTAATTCAACAAGAAAAATAATATCCCA | 254 |
| 42bpsGridiron-135 | CATTAAACGGGTAAAATACGTTGAGTGAATAACCTTGCTTCT | 255 |
| 42bpsGridiron-136 | AAAATCGCGCAGAGGCGAATTATGGTTTACCAGCGCCAAAGA | 256 |
| 42bpsGridiron-137 | ATAAAAGAAACGCAAAGACACCAACGCCAACATGTAATTTAG | 257 |
| 42bpsGridiron-138 | GTGATAAATAAGGCGTTAAATAGAATACACTAAAACACTCAT | 258 |
| 42bpsGridiron-139 | ACCTAAAACGAAAGAGGCAAAAAGAATAAACACCGGAATCAT | 259 |
| 42bpsGridiron-140 | AATTACTAGAAAAAGCCTGTTGGATAAGTGCCGTCGAGAGGG | 260 |
| 42bpsGridiron-141 | GGGTTTTGCTCAGTACCAGGCTAGTATCATATGCGTTATACA | 261 |
| 42bpsGridiron-142 | TACATTTAACAATTTCATTTGATAGGTGTATCACCGTACTCA | 262 |
| 42bpsGridiron-143 | TTGATATAAGTATAGCCCGGAAATTACCTTTTTAATGGAAA | 263 |
| 42bpsGridiron-144 | AATTCTTACCAGTATAAAGCCGTATTAAGAGGCTGAGACTCC | 264 |
| 42bpsGridiron-145 | GTGCCCGTATAAACAGTTAATCATCAAGAAAACAAAATTAAT | 265 |
| 42bpsGridiron-146 | AAAAGAAGATGATGAAACAAAGCCCCCTGCCTATTTCGGAAC | 266 |
| 42bpsGridiron-147 | CTATTATTCTGAAACATGAAAAACGCTCAACAGTAGGGCTTA | 267 |
| 42bpsGridiron-148 | ATTGAGAATCGCCATATTTAACACGGAATAAGTTTATTTTGT | 268 |
| 42bpsGridiron-149 | CACAATCAATAGAAAATTCATATTCATTTCAATTACCTGAGC | 269 |
| 42bpsGridiron-150 | CAGTACATAAATCAATATATGAATGCCACTACGAAGGCACCA | 270 |
| 42bpsGridiron-151 | GTAAATCGTCGCTATTAATTAACCTGCTCCATGTTACTTAGC | 271 |
| 42bpsGridiron-152 | AGCGCGAAACAAAGTACAACGATGGTTTGAAATACCGACCGT | 272 |
| 42bpsGridiron-153 | TATAACTATATGTAAATGCTGCAAATATCGCGTTTTAATTCG | 273 |
| 42bpsGridiron-154 | AAGAGGAAGCCCGAAAGACTTATGCAAATCCAATCGCAAGAC | 274 |
| 42bpsGridiron-155 | TAGTGAATTTATCAAAATCATGGAAGCAAACTCCAACAGGTC | 275 |
| 42bpsGridiron-156 | AGCTTCAAAGCGAACCAGACCAGGTCTGAGAGACTACCTTTT | 276 |
| 42bpsGridiron-157 | AAAGAACGCGAGAAAACTTTTCTGACTATTATAGTCAGAAGC | 277 |
| 42bpsGridiron-158 | CTCAAATGCTTTAAACAGTTCTAAGACGCTGAGAAGAGTCAA | 278 |
| 42bpsGridiron-159 | AAACATAGCGATAGCTTAGATAGAAAACGAGAATGACCATAA | 279 |
| 42bpsGridiron-160 | ATCAAAAATCAGGTCTTTACCTCAAATATATTTTAGTTAATT | 280 |
| 42bpsGridiron-161 | TCATCTTCTGACCTAAATTTAGAGATTTGTATCATCGCCTGA | 281 |
| 42bpsGridiron-162 | TAAATTGTGTCGAAATCCGCGATTTTCCCTTAGAATCCTTGA | 282 |

The claims are not intended to be limited to the embodiments and examples described herein.

We claim:

1. A method of forming a DNA gridiron unit, comprising: combining a plurality of scaffold strands and staple strands complementary to said scaffold strand under conditions suitable for the formation of four four-arm junctions linked together in a two-layer square frame in which helices on opposite sides lie in the same plane.

2. The method of claim 1, wherein said scaffold strands comprise single stranded M13mp18 DNA.

3. The method of claim 1, wherein said scaffold strands are combined with a 10-x molar excess of staple strands in TAE $Mg^{2+}$ buffer.

4. The method of claim 1, wherein said scaffold strands and staple strands are annealed at 95 to 86° C. at 4° C. per 5 min; 85 to 70° C. at 1° C. per 5 min; 70 to 40° C. at 1° C. per 15 min; then 40 to 25° C. at 1° C. per 10 min.

5. The method of claim 4, wherein said scaffold strands and staple strands are annealed at 95 to 76° C. at 2° C. per 5 minutes; then 76 to 24° C. at 4° C. per 5 minutes.

6. A method of forming a DNA origami nanostructure, comprising:
    linking a plurality of DNA gridiron units of a selected sequence of nucleotides under conditions suitable to form a 2D or 3D lattice of a selected shape.

7. The method of claim 6, wherein the selected shape is a S-shape, sphere, or screw.

8. A DNA nanostructure comprising
    a plurality of immobile Holliday junction analogs linked together in a plurality of layered frames, wherein each layer of frame has at least two DNA helices which lie on opposite sides of the Holliday junction which also lie in the same plane, and wherein said plurality of immobile Holliday junction analogs are linked together with a central strand of single-stranded DNA within said layer of frame, and wherein one or more of the plurality of immobile Holliday junction analogs together form a curvilinear surface.

9. The DNA nanostructure of claim 8, wherein a layer of frame is distorted along the plane of the layer.

10. The DNA nanostructure of claim 8, wherein the DNA nanostructure is in the shape of a sphere, S-shaped structure, or screw.

11. The DNA nanostructure of claim 10, wherein the DNA nanostructure is in the shape of a sphere.

12. The DNA nanostructure of claim 11, wherein the sphere confines an interstitial space defining a cavity.

13. The DNA nanostructure of claim 8, wherein said single stranded DNA comprises M13mp18 DNA.

14. The DNA nanostructure of claim 13, further comprising one or a plurality of staple strand sequences.

15. The DNA nanostructure of claim 14, wherein the staple strand sequences are independently from 40 to 45 nucleotides in length.

* * * * *